(12) United States Patent
Hoppe et al.

(10) Patent No.: US 11,724,366 B2
(45) Date of Patent: Aug. 15, 2023

(54) ROTATABLE HAND TOOLS AND FASTENERS

(71) Applicant: Milwaukee Electric Tool Corporation, Brookfield, WI (US)

(72) Inventors: Christopher S. Hoppe, Milwaukee, WI (US); Aaron S. Blumenthal, Wauwatosa, WI (US); Aaron M. Williams, Milwaukee, WI (US); Michael John Caelwaerts, Milwaukee, WI (US); Max R. Sawa, Palatine, IL (US); Caroline Hope, Grafton, WI (US); James Wekwert, Wauwatosa, WI (US); Jason D. Thurner, Menomonee Falls, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 364 days.

(21) Appl. No.: 16/869,229

(22) Filed: May 7, 2020

(65) Prior Publication Data
US 2020/0262034 A1  Aug. 20, 2020

Related U.S. Application Data

(63) Continuation of application No. PCT/US2018/060027, filed on Nov. 9, 2018.
(Continued)

(51) Int. Cl.
*B25B 23/142*  (2006.01)
*B25B 23/147*  (2006.01)
(Continued)

(52) U.S. Cl.
CPC ............ *B25B 17/02* (2013.01); *B25B 21/004* (2013.01)

(58) Field of Classification Search
None
See application file for complete search history.

(56) References Cited

U.S. PATENT DOCUMENTS 2,537,175 A  1/1951  Viets
2,578,686 A  12/1951  Fish
(Continued)

FOREIGN PATENT DOCUMENTS

CN  1597260  3/2005
CN  101232974  7/2008
(Continued)

OTHER PUBLICATIONS

International Search Report and Written Opinion for International Application No. PCT/US2019/017686 dated May 29, 2019, 14 pages.
(Continued)

*Primary Examiner* — Brian D Keller
(74) *Attorney, Agent, or Firm* — Reinhart Boerner Van Deuren s.c.

(57) ABSTRACT

A hand tool for driving a fastener is provided. The hand tool includes gearing that interconnects a splined socket to a rotatable or trigger actuator and increases a rotational speed of the splined socket relative to the actuator. The hand tool may include a power tool receiver 38 or an independent motor to drive rotation of the splined socket to advance or retract a fastener from a threaded shaft. By increasing the speed and conserving rotational inertia, the hand tool reduces the time to secure a fastener on a threaded shaft. A rotatable nut is provided. The rotatable nut can slideably orient along a first axis and threadedly orient along a second axis to fasten to an adjacent surface.

20 Claims, 15 Drawing Sheets

Related U.S. Application Data

(60) Provisional application No. 62/585,369, filed on Nov. 13, 2017, provisional application No. 62/585,507, filed on Nov. 13, 2017, provisional application No. 62/584,382, filed on Nov. 10, 2017.

(51) Int. Cl.
*B25B 23/08* (2006.01)
*B25B 17/02* (2006.01)
*B25B 21/00* (2006.01)

(56) References Cited

U.S. PATENT DOCUMENTS

| | | | |
|---|---|---|---|
| 3,589,489 | A | 6/1971 | Fehlings |
| 3,726,161 | A | 4/1973 | Williams et al. |
| 4,043,228 | A | 8/1977 | Venezio |
| 4,506,567 | A | 3/1985 | Makhouf |
| 4,551,875 | A | 11/1985 | Getz et al. |
| 5,123,309 | A | 6/1992 | Moceri |
| 5,363,726 | A | 11/1994 | Smith |
| 5,388,478 | A | 2/1995 | Castle |
| 5,392,671 | A | 2/1995 | Hazard |
| 5,522,285 | A | 6/1996 | Wilson, Jr. et al. |
| 5,537,897 | A | 7/1996 | Wilson, Jr. |
| 5,628,556 | A | 5/1997 | Hrabar et al. |
| 5,732,605 | A | 3/1998 | Mann |
| 5,924,339 | A * | 7/1999 | Huang .................... D06F 57/00 81/57.3 |
| 6,487,940 | B2 | 12/2002 | Hart et al. |
| 6,732,615 | B2 | 5/2004 | Layaou |
| 6,945,139 | B1 | 9/2005 | Johnson |
| 7,703,356 | B2 | 4/2010 | Bass |
| 7,934,440 | B2 | 5/2011 | Samudosky |
| 8,333,134 | B1 | 12/2012 | Duffy |
| 9,067,309 | B2 | 6/2015 | McMenemy |
| 9,144,891 | B2 | 9/2015 | Khangar et al. |
| 10,926,381 | B2 | 2/2021 | Wilson, Jr. |
| 2002/0023522 | A1 | 2/2002 | Layaou |
| 2002/0096020 | A1 | 7/2002 | Hart et al. |
| 2004/0074344 | A1 | 4/2004 | Carroll |
| 2008/0115628 | A1 | 5/2008 | Shirai et al. |
| 2008/0196562 | A1 | 8/2008 | Elliston et al. |
| 2011/0000342 | A1 | 1/2011 | Lambert et al. |
| 2011/0048175 | A1 | 3/2011 | LeVert |
| 2013/0032007 | A1 | 2/2013 | Chen |
| 2013/0239755 | A1 | 9/2013 | Khangar et al. |
| 2014/0182420 | A1 | 7/2014 | Chen et al. |
| 2015/0375378 | A1 | 12/2015 | Hewitt et al. |
| 2017/0259410 | A1 | 9/2017 | Chang |

FOREIGN PATENT DOCUMENTS

| | | |
|---|---|---|
| CN | 202468628 U | 10/2012 |
| CN | 202468658 | 10/2012 |
| CN | 204868680 | 12/2015 |
| CN | 205915260 | 2/2017 |
| DE | 2552889 | 5/1977 |
| DE | 102011100707 | 11/2012 |
| DE | 202013104060 | 9/2013 |
| EP | 3213870 | 9/2017 |
| JP | 05-042485 | 2/1993 |
| KR | 10-0641898 | 11/2006 |
| WO | WO 92/14585 | 9/1992 |

OTHER PUBLICATIONS

International Search Report and Written Opinion for International Application No. PCT/US2018/060027 dated May 29, 2019, 18 pages.

* cited by examiner

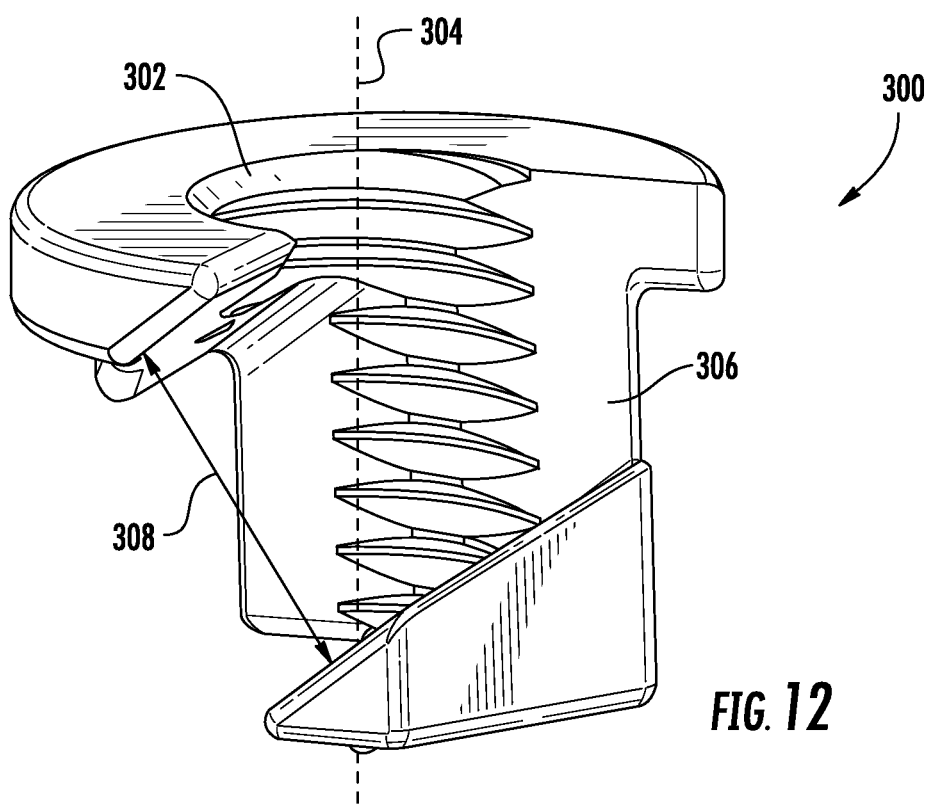
FIG. 12
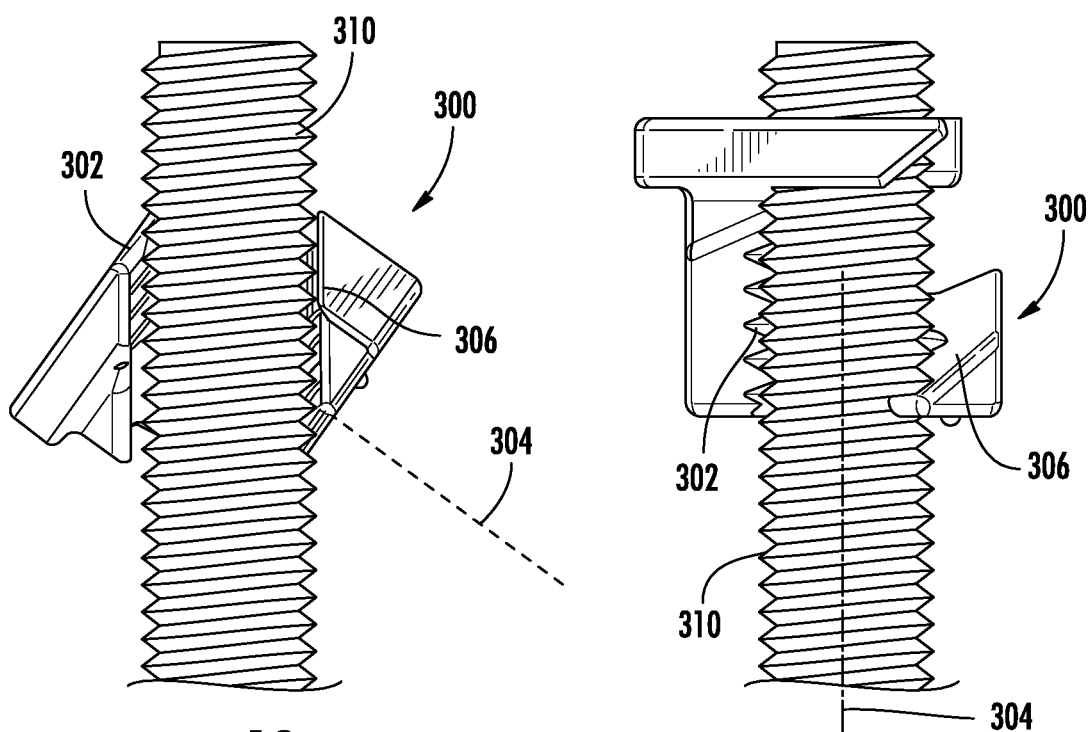
FIG. 13
FIG. 14

ROTATABLE HAND TOOLS AND FASTENERS

CROSS-REFERENCE TO RELATED PATENT APPLICATION

The present application is a continuation of International Application No. PCT/US2018/060027, filed Nov. 9, 2018, which claims the benefit of and priority to U.S. Provisional Application No. 62/584,382 filed on Nov. 10, 2017, and U.S. Provisional Application No. 62/585,369 filed on Nov. 13, 2017, and U.S. Provisional Application No. 62/585,507 filed on Nov. 13, 2017, which are incorporated herein by reference in their entireties.

BACKGROUND OF THE INVENTION

The present invention relates generally to the field of hand tools and fasteners. The present invention relates specifically to methods and mechanisms for increasing a speed of rotation for a hand tool. Tools and devices for quickly rotating a fastener about a threaded shaft are described.

SUMMARY OF THE INVENTION

One embodiment of the invention relates to a hand tool. The hand tool includes a housing that forms an outer grip and a splined socket that passes through the housing and defines a passageway that extends at least part way through the housing. A rotatable actuator rotates the splined socket within the housing as a rotational force is applied to the outer grip. Gearing interconnects the rotatable actuator to the splined socket. The gearing increases or decreases rotational speed of the splined socket relative to the rotational speed of the outer grip as the housing is rotated. The rotational speed of the splined socket relative to the outer grip is increased or decreased as the outer grip is rotated.

Another embodiment of the invention relates to a hand tool. The hand tool includes an outer housing forming an outer grip and a splined socket coupled to the housing. The splined socket passes through the housing and defines a passageway through the housing. A trigger actuator may be coupled to the splined socket. Gearing interconnects the trigger actuator to the splined socket. The gearing increases or decreases the rotational speed of the splined socket relative to the rotational speed generated by the trigger actuator. Movement of the trigger actuator generates rotation of the splined socket. The gearing interconnecting the trigger actuator to the splined socket increases or decreases the rotational speed of the splined socket relative to the movement of the trigger actuator.

Another embodiment of the invention relates to a power tool. The power tool includes a housing defining a handle and a splined socket coupled to the housing. The splined socket passes through the housing and defines a passageway through the housing. The splined socket includes a void to receive a fastener on a threaded shaft. A motor may be coupled to the splined socket and rotate the splined socket within the housing. The motor provides a speed of rotation to the splined socket. Gearing may interconnect the splined socket to the motor. The gearing has a gear ratio that increases or decreases the rotational speed of the splined socket relative to the speed of the motor. The gearing includes a driven gear coupled to the splined socket. The power tool has a slot through the driven gear and the housing. The slot has a width greater than the diameter of the splined socket and is configured to facilitate interchanging the splined socket. The slot in the housing and in the driven gear aligns with the void in the splined socket to receive a fastener on a threaded shaft within the splined socket.

Another embodiment of the invention relates to a quick-set fastener. The quick-set fastener includes drive surfaces along a periphery of a nut. The drive surfaces are configured to receive a tool to rotate the nut about a threaded shaft along a first axis of the nut. The quick-set fastener includes a threaded bore extending through a nut along the first axis of the nut. The threaded bore is configured to couple to a threaded shaft passing through the threaded bore along the first axis of the nut. A smooth bore extends through the nut along a second axis of the nut. The smooth bore intersects the first axis of the nut at an acute angle. The smooth bore has a diameter configured to receive an outer diameter of the threaded shaft where the threaded shaft can slide freely through the smooth bore. The quick-set fastener includes an opening along the periphery of the nut and through one or more drive surfaces in a direction of the second axis. The opening is configured to receive the threaded shaft, the threaded shaft is inserted into the nut through the opening and slides along the second axis of the nut. When the nut is in position, the nut rotates to the first axis and is fastened along the threaded bore.

Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which:

FIG. 12 is a perspective view of a quick-set fastener, according to an exemplary embodiment.

FIG. 13 illustrates the fastener of FIG. 12 in a sliding adjustment position or angled position for attachment to a threaded shaft, according to an exemplary embodiment.

FIG. 14 illustrates the fastener of FIG. 12 in a threaded adjustment position or aligned position in threaded engagement with the threaded shaft, according to an exemplary embodiment.

DETAILED DESCRIPTION

Figure 1:
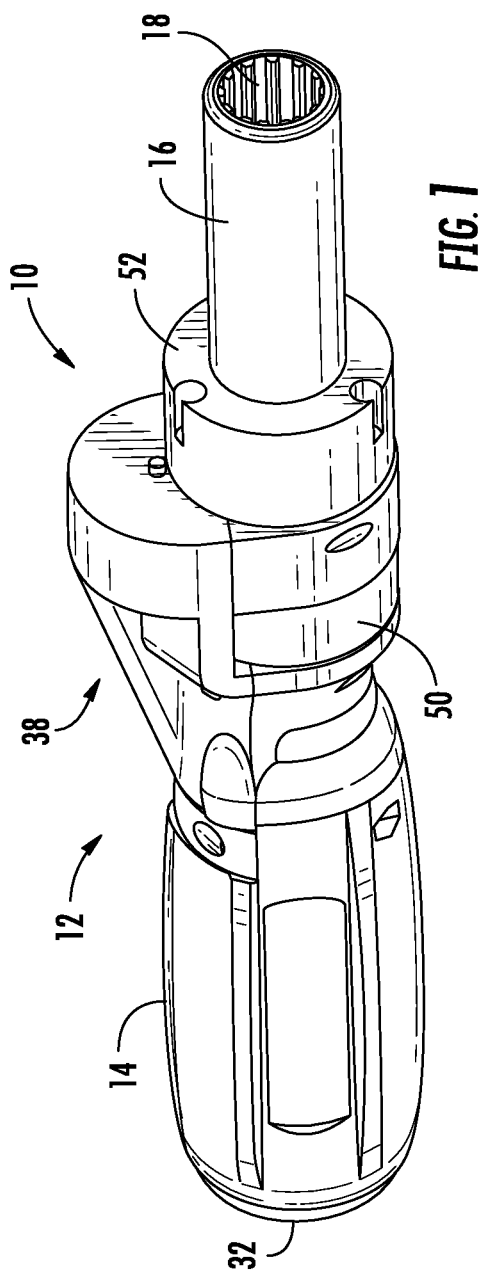
FIG. 1 is a perspective view of a fastener driving hand tool, according to an exemplary embodiment.
Figure 2:
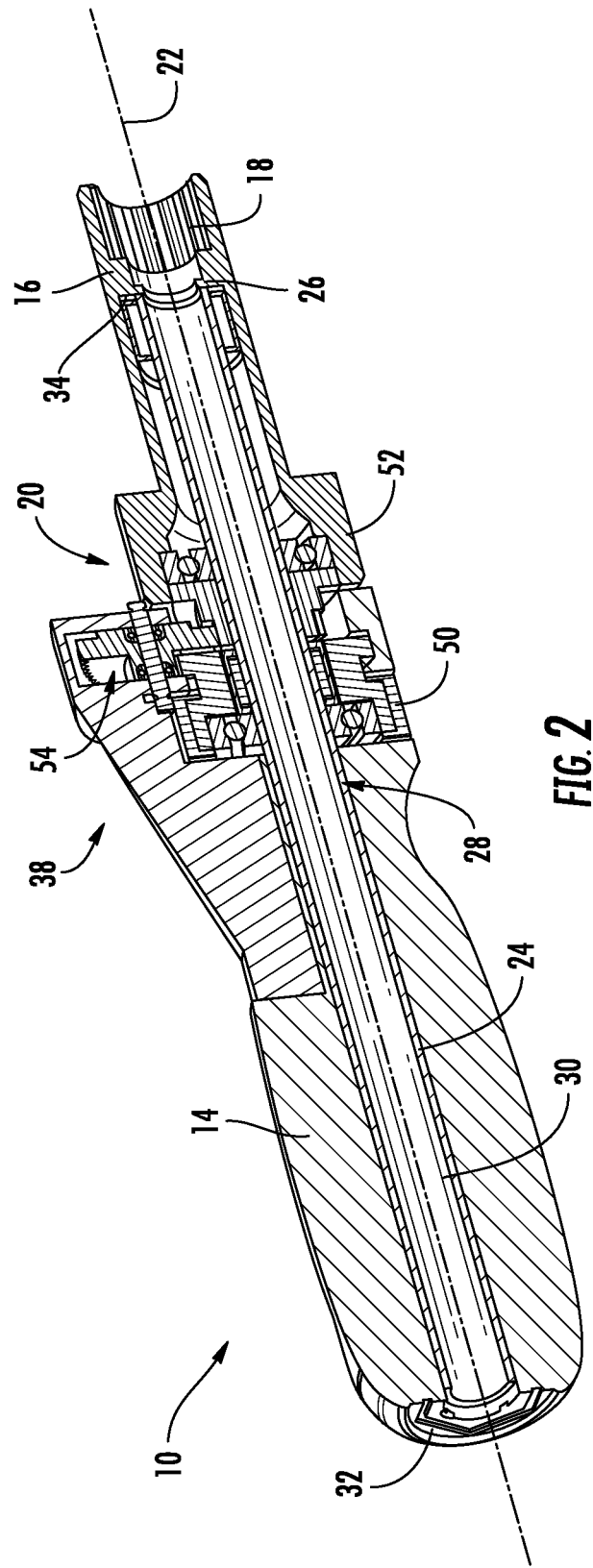
FIG. 2 is a cross-sectional view of the tool of FIG. 1, according to an exemplary embodiment.

The figures generally illustrate various embodiments of a hand tool for fastening a fastener to a threaded shaft. Hand tools may be used to attach a fastener to a rod, to drill a hole, and/or to screw a threaded shaft or shaft into a threaded or unthreaded opening. In some embodiments, the speed of rotation is increased from the input rotation (e.g., rotation of the hand tool's handle) to the output rotation of the splined sprocket coupled to the fastener. The rotation speed is increased through a transformation (e.g., gear ratio) of the hand tool rotation. The hand tool may include a splined socket coupled to an actuator through one or more gears to increase the speed of rotation at the splined socket. Bearings and flywheels enhance the angular momentum of the splined socket to continue rotation even after the hand tool has finished rotation. In this way, the hand tool increases the input rotation speed of the hand tool and the duration of rotation through conservation of the angular momentum at the splined socket.

The hand tool can include a rotatable actuator or a linear actuator that converts the actuation into an angular speed and rotation. For example, the rotation of the hand tool may cause a rotatable actuator to increase and/or conserve the rotation of a splined socket on the hand tool. Alternatively, a lever or trigger may generate a linear motion that is converted into a rotation through a cam (or gearing) mechanism of the linear actuator that increases the speed and duration of rotation at the splined socket. Flywheels and gear ratios may increase the output rotational speed and rotational duration at the splined socket. A power tool receiver 38 may be used to increase the speed of rotation, e.g., from a power drill. A power tool receiver 38 enables the use of a motor external to the hand tool to drive the splined socket. In some embodiments, the motor is directly housed within the hand tool to provide continuous rotation to the splined socket. The motor within the hand tool can increase the rotation speed of the splined socket and provide continuous rotation of the splined socket.

Applicant has found that by conserving the rotational inertia and increasing the speed of rotation at the splined socket, the hand tool and/or power tool can more quickly attach a fastener (e.g., a nut) to a threaded shaft. Allowing the threaded shaft to pass through the central bore of the tool enables quick operation without relocating the splined socket after each rotation. The gearing increases the gear ratio and speed of the splined socket. The flywheel conserves the rotational inertia to increase the duration of the splined socket rotates. Together the gearing and the flywheel reduce the time to run a fastener along the threaded shaft.

A fastener may also be designed to allow rapid positioning on a threaded shaft. In some embodiments, the fastener may have an opening through drive surfaces used to rotate the fastener. This configuration allows the user to place the fastener directly onto the threaded shaft near the desired location for threaded rotation. In other embodiments, the fastener has no openings in the drive surfaces but has two diameters passing through the nut. The fastener may have two positions, a sliding adjustment position and a threaded adjustment position along a threaded shaft. The fastener can slide along the threaded shaft in the sliding adjustment position and rotate into the threaded adjustment position to threadedly engage the threaded shaft. In the sliding adjustment position, the fastener can slidably move along the threaded shaft because the bore through the fastener is greater than the outer diameter of the threaded shaft. The fastener can rotate, e.g., from 5 to 30 degrees, into the threaded adjustment position. In the threaded adjustment position, the fastener threadedly engages with the threaded shaft and is rotated about the shaft to lock the fastener into position. Applicant has found that these fastener types enable quick placement of the fastener in the sliding position to an approximate location along a threaded shaft. The fastener can then be rotated into the threaded position to threadedly engage and fasten the fastener (e.g., against an adjacent surface).

FIGS. 1-5 illustrate a fastener drive tool or hand tool 10 according to an embodiment of the invention. The illustrated hand tool 10 includes a housing 12, a handle or outer grip 14, a drive member 16 coupled to the outer grip 14 and a splined socket 18. The hand tool 10 includes a drive mechanism 20 (FIG. 2) for rotating drive member 16 and splined socket 18 relative to the outer grip 14 about a longitudinal rotational axis 22. Drive mechanism 20 includes an actuator 50, a flywheel 52 fixed to drive member 16 and coupled to splined socket 18 and gearing 54 interconnecting actuator 50 to drive member 16. In the illustrated embodiment, the drive member 16 includes a splined socket 18 located at an end of the drive member 16 opposite the outer grip 14. Drive member 16 or splined socket 18 may include different shaped sockets (e.g., hexagonal, square, rectangular, etc.), or the drive member 16 may include other fastener driving features, such as a screwdriver bit or a drill bit. For example, a hexagonal splined socket 18 may couple to a hexagonally shaped screwdriver bit. The illustrated outer grip 14 is a barrel-type handle having a generally cylindrical outer grip 14 that can be formed, for example, from an elastomeric material.

Housing 12 forms an outer grip 14 about the fastener drive tool. Outer grip 14 can have a circular cross-sectional shape or another shape. For example, outer grip 14 can have a rectangular, hexagonal, or octagonal cross-sectional shape. The housing 12 and drive member 16 including the splined socket 18 include respective bores 24 and 26 extending along the rotational axis 22 of the splined socket 18. The housing bore 24 and drive member bore 26 are aligned and define a continuous passageway 28 extending through the hand tool 10 along the longitudinal rotational axis 22. For example, the splined socket 18 passes through the housing 12 and defines a passageway 28 that extends at least part way through the housing 12. In other embodiments, the passageway 28 is continuous and passes all the way through housing 12. The splined socket 18 may couple to housing 12 and/or pass through housing 12 to define a continuous passageway 28 through housing 12.

Figure 3:
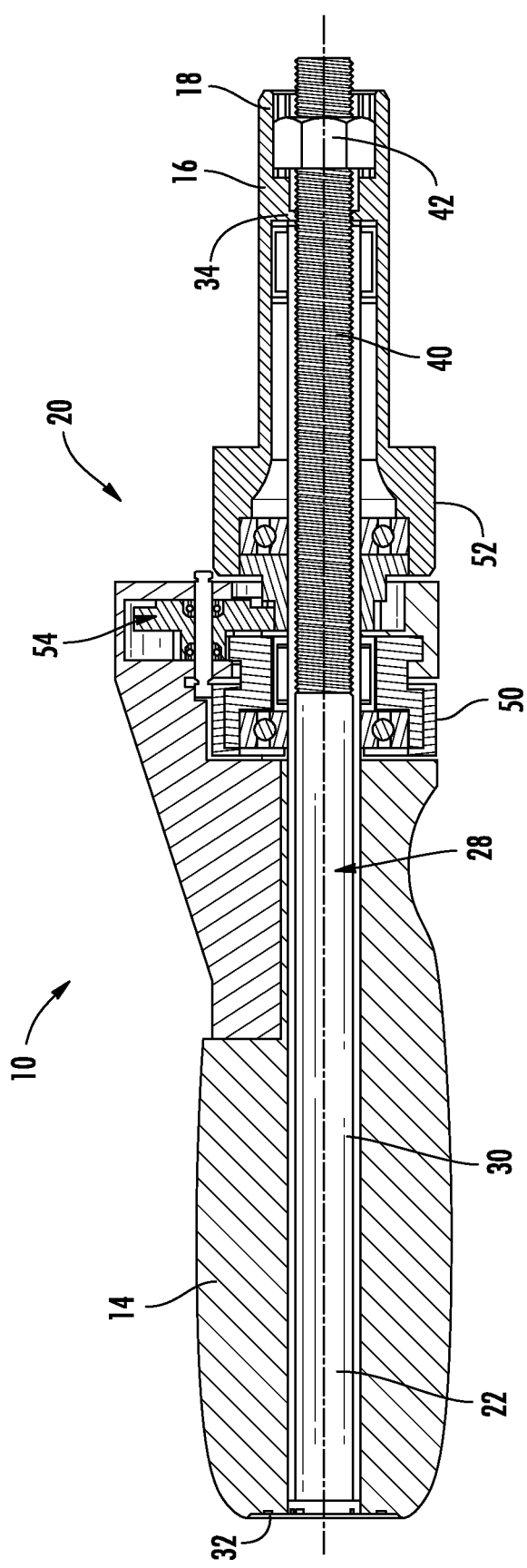
FIG. 3 is a cross-sectional view of the tool of FIG. 1 being used to rotate a fastener or nut along a threaded shaft, according to an exemplary embodiment.

In some embodiments, a liner tube 30 extends from a back end 32 of the outer grip 14 to an internal shoulder 34 of the drive member 16 adjacent the splined socket 18. The continuous passageway 28 extends through the entire length of the liner tube 30. Continuous passageway 28 is configured to receive a length of a threaded shaft or shaft 36 when the hand tool 10 is used to drive a fastener (e.g., a nut 42) along the shaft 36 (FIG. 3). In other words, the threaded shaft 36 can pass through the splined socket 18 of drive member 16 and the outer grip 14 to allow the hand tool 10 to drive the nut 42 along any length of threaded shaft 36.

Figure 4:
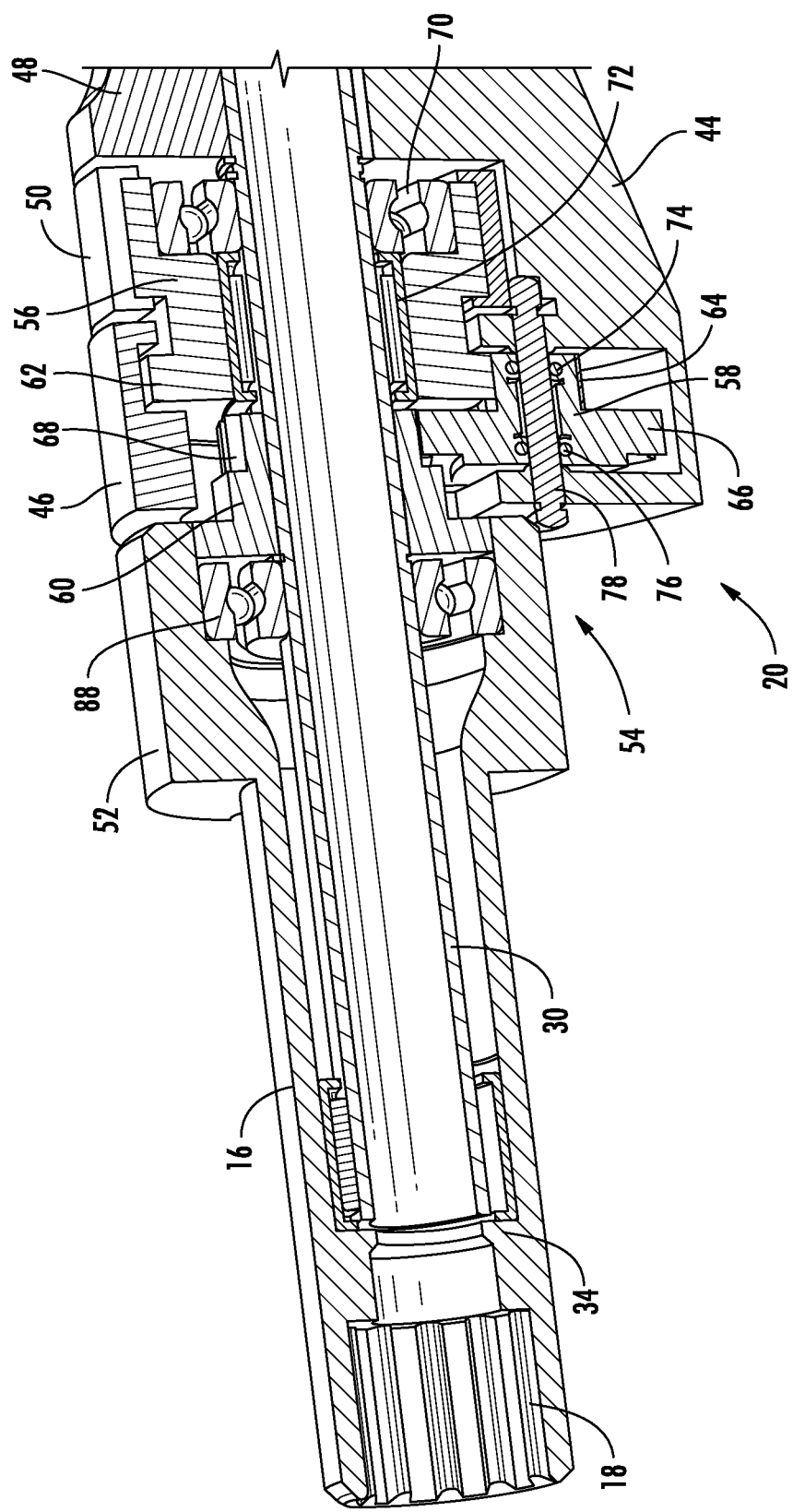
FIG. 4 is an enlarged cross-sectional view illustrating a drive mechanism of the tool of FIG. 1, according to an exemplary embodiment.
Figure 5:
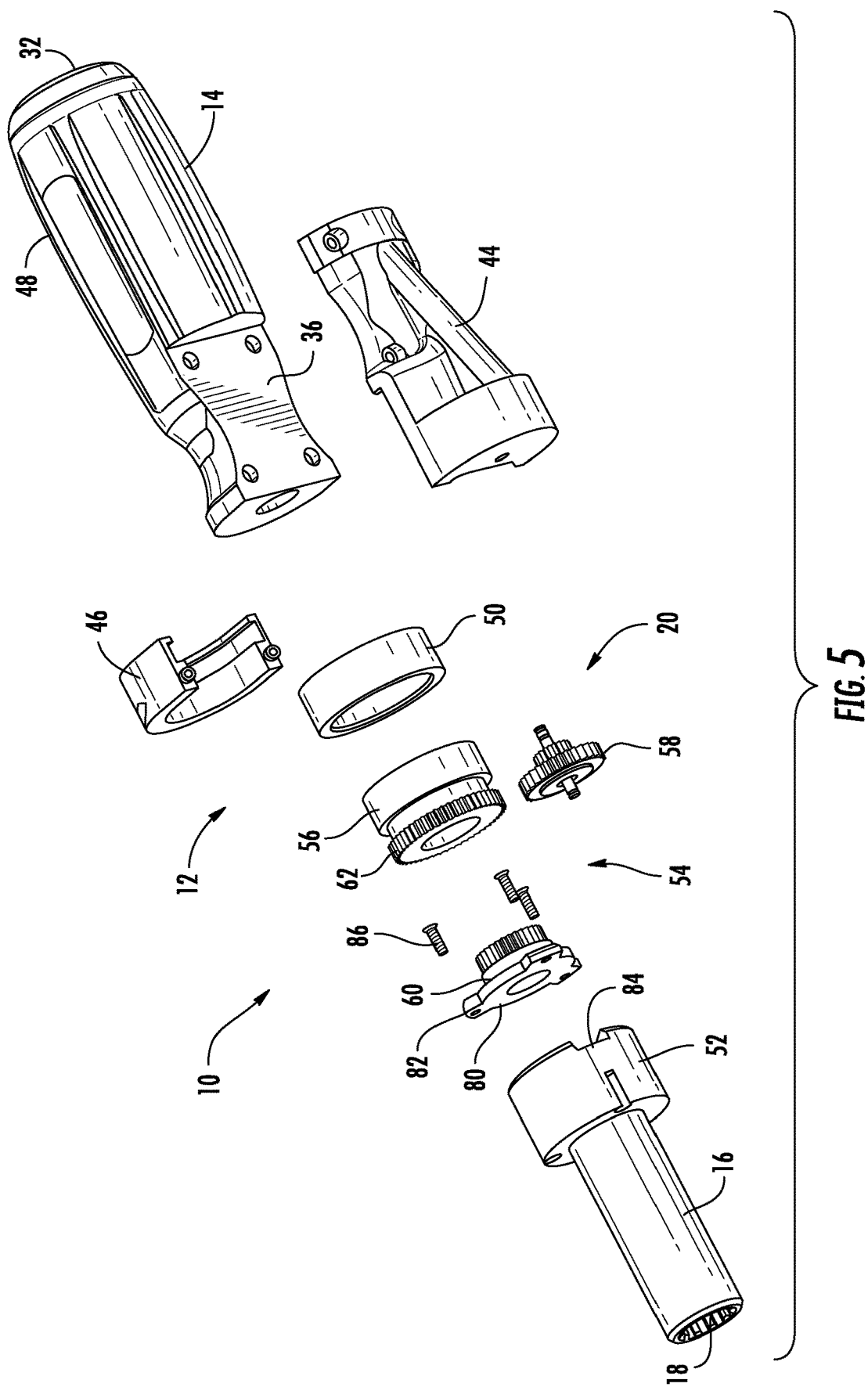
FIG. 5 is an exploded view of the tool of FIG. 1, according to an exemplary embodiment.

With reference to FIGS. 4 and 5, housing 12 is made of three component parts: a drive housing 44, an actuator housing 46, and a handle housing 48. Drive housing 44 encloses at least a portion of the drive mechanism 20. Drive housing 44 includes a first portion coupled at a recessed area of the outer grip 14 to the handle housing 48 and a second portion coupled to the actuator housing 46. Handle housing 48 forms the outer grip 14.

Drive member 16 may couple to the splined socket 18 to drive a fastener at the splined socket. Drive member 16 may fixedly couple to splined socket 18 or may be coupled through gearing 54 or other interconnected parts. Drive member 16 may be or integral to splined socket 18 such that drive member 16 and splined socket 18 form a single continuous part. In some embodiments, drive member 16 attaches to gearing 54 and in other embodiments, drive member 16 is part of the gearing 54 driving rotation of the splined socket 18.

Splined socket 18 is driven by rotational actuator 50. The motion of the actuator 50 is transformed by the gearing 54 and transmitted to the splined socket 18. Splined socket 18 may be hexagonal shaped configured to receive a hexagonal nut. Splined socket 18 may include a shoulder 34 extending inward from a surface defining the passageway 28. A width of passageway 28 at shoulder 34 is less than the width at an open end of passageway 28. In this way, shoulder 34 orients the hexagonal nut within the splined socket 18 and prevents the hexagonal nut from passing through the splined socket 18.

Splined socket 18 may have another shape (e.g., circular, square, rectangular, pentagonal, hexagonal, or octangular). The splined socket 18 may follow the passageway 28 through housing 12 and form an opening through a central longitudinal or rotatable axis 22 of the housing 12. For example, where splined socket 18 passes through a center of housing 12. Splined socket 18 can have different diameters. For example, the splined socket 18 includes a smaller diameter through a part of the splined socket defining an internal shoulder 34. The shoulder 34 can be shaped to consistently position a nut concentrically within a passageway 28 of the splined socket 18.

In some embodiments, an outer diameter of the splined socket 18 can increase or decrease when the splined socket 18 is restrained against an applied rotation at the outer grip of housing 12. The outer diameter of the splined socket 18 can be reduced (e.g., to clamp a bit within the splined socket 18). When the splined socket 18 is restrained, and the outer grip of the housing 12 is rotated in a first direction the outer diameter of the splined socket 18 reduces. The outer diameter of the splined socket 18 can be expanded (e.g., to remove a clamped bit within the splined socket 18). When the splined socket 18 is restrained, and the outer grip is rotated in a second direction opposite the first direction the outer diameter of the splined socket is expanded.

Figure 6:
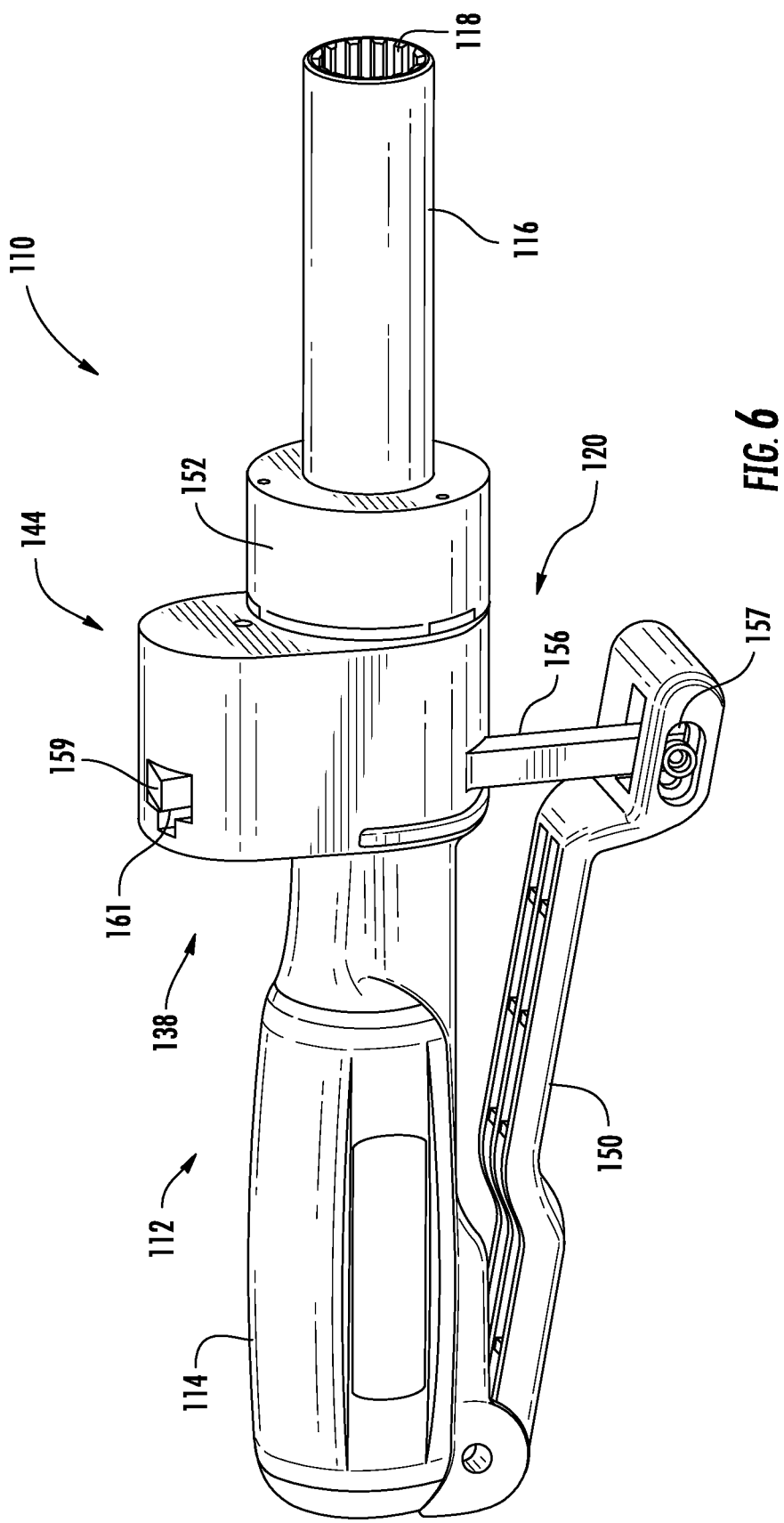
FIG. 6 is a perspective view of a fastener driving hand tool, according to another embodiment of the invention.
Figure 7:
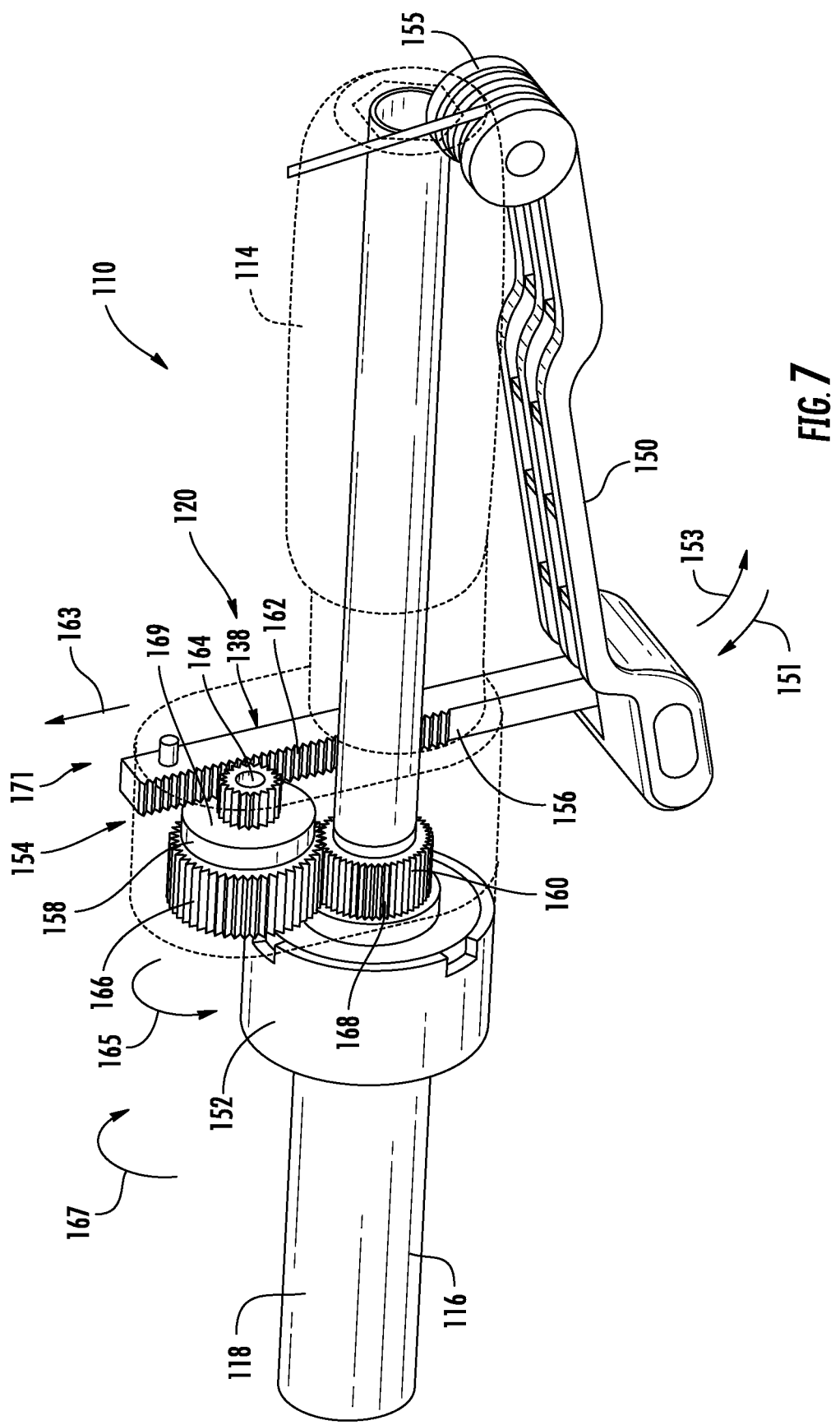
FIG. 7 is a perspective view of the fastener driving hand tool of FIG. 6, according to an exemplary embodiment.

In some embodiments, rotatable actuator 50 rotates the splined socket 18 within the housing 12 as a rotational force is applied to the outer grip 14. For example, actuator 50 is a wheel that is rotatable by a user of the hand tool 10 to rotate the drive member 16 (via the gearing 54). In other embodiments, as illustrated in FIGS. 6-7, a linear or trigger actuator 150 couples to the splined socket 118 and may include a pivoting lever and/or a trigger motion converting mechanism to convert movement of the lever into rotation of the drive member 116. In some embodiments, actuator 50 or 150 may include an interface for connection to a rotary power tool. Flywheel 52 or 152 may increase the mass of drive member 16 or 116 to increase the rotational inertia. Flywheel 52 or 152 can be integrally formed with drive member 16 or 116 as a single piece; however, flywheel 52 or 152 may alternatively be formed separately and coupled for co-rotation with drive member 16 or 116 in any suitable manner. Flywheel 52 or 152 may couple to splined socket 18 or 118 to add circumferential mass to the splined socket 18 or 118 in order to conserve rotational inertia as a rotational force is applied to an outer grip 14 or 114 of the housing 12 or 112. In some embodiments, an electric motor couples to gearing 54 or 154, rotatable actuator 50, and/or trigger actuator 150 to rotate the splined socket 18 or 118.

Returning to FIGS. 1-5, hand tool 10 includes a set of gears or gearing 54. The gearing 54 interconnects the rotatable actuator 50 (or trigger actuator 150, FIG. 6) to the splined socket 18. The gearing 54 increases the rotational speed of the splined socket 18 relative to the rotational speed of the outer grip as the housing 12 is rotated (or the trigger is activated). Gearing 54 may similarly increase the rotational speed of the splined socket 18 relative to the rotational speed generated by the trigger actuator 150. In some embodiments, hand tool 10 may include a power tool receiver 38 that may be connected to the gearing 54. The power tool receiver 38 attaches a power tool to gearing 54 or the actuator 50 to rotate the splined socket 18.

Gearing 54 includes a drive gear 56, an idler gear 58, and a driven gear 60. Drive gear 56 is coupled for co-rotation with actuator 50 and includes a set of gear teeth 62 meshed with a first set of gear teeth 64 on idler gear 58. The second set of gear teeth 66 on idler gear 58 meshes with the gear teeth 68 on the driven gear 60. In some embodiments, drive gear 56, idler gear 58, and driven gear 60 convert the torque applied to the hand tool into an increased splined socket 18 rotational speed. In other embodiments, the speed of rotation at the outer grip 14 is converted into an increased torque at the splined socket 18. In some embodiments, the operator can select the gear ratio of gearing 54. In this embodiment, the user can select whether the hand tool 10 delivers an increased torque or an increased speed at the splined socket 18 relative to the rotation of the outer grip 14 of hand tool 10.

The drive gear 56 is rotatably supported on the liner tube 30 by first and second bearings 70 and 72 (FIG. 4). In the illustrated embodiment, the first bearing 70 is a ball bearing, and the second bearing 72 is a needle bearing; however, other types of bearings may be used. The idler gear 58 is rotatably supported by third and fourth bearings 74, 76 on a shaft 78 within the drive housing 44. The third and fourth bearings 74 and 76 are ball bearings in the illustrated embodiment; however other types of bearings may be used.

The idler gear 58 includes a second set of gear teeth 66 offset from the first set of gear teeth 64 and meshed with a set of gear teeth 104 on the driven gear 60. The driven gear 60 includes a flange 80 offset from the driven set of teeth 68 (FIG. 5). The illustrated flange 80 includes a plurality of radially-outward extending lobes 82 that are received in corresponding axial recesses 84 in the flywheel 52.

In some embodiments, the gearing 54 is adjustable. Adjustable gearing 54 provides different gear ratios. Gearing 54 provides a first gear ratio (e.g., 1:2) that rotates the splined socket 18 a first speed relative to rotation at the outer grip and a second gear ratio (e.g., 1:3) that rotates the splined socket a second speed relative to rotation at the outer grip. The first speed of rotation can be less than the second speed of rotation. The user can switch from the first gear ratio to the second gear ratio. In some embodiments, additional gear ratio's are available to a user such as a third gear ratio (e.g., 1:4), a fourth gear ratio (e.g., 1:5), and a sixth gear ratio (e.g., 2:1).

Fasteners 86 may extend through the lobes 82 and into the flywheel 52 to fix the driven gear 60 to the flywheel 52. The flywheel 52 may be coupled to the splined socket 18 to add circumferential mass to the splined socket 18 and conserve rotational inertia of the splined socket 18 as a rotational force is applied to the outer grip 14 of hand tool 10. Flywheel 52 may be coupled to the splined socket 118 of a trigger actuator 150 or a splined socket 18 of rotatable actuator 50. The flywheel 52 is rotatably supported on the liner tube 30 by a fifth bearing 88, (e.g., a ball bearing). The drive gear 56, idler gear 58, and driven gear 60 are configured to provide a speed increase from the rotatable actuator 50 to the drive member 16 and splined socket 18. For example, the gearing 54 may provide a 1:2 gear ratio or speed ratio from the rotatable actuator 50 to the drive member 16. As such, the drive member 16 rotates the splined socket 18 twice for every rotation of the actuator 50. In other embodiments, the gearing 54 may provide other gear ratios from the actuator 50 to the drive member 16. For example, the gearing 54 may provide a 2:1, 1:1, 1:2, 1:3, 1:4, or 1:5 gear ratio.

In some embodiments, the gear ratio may be adjustable by a user of the hand tool 10 (e.g., via a shifting mechanism). The user may select a 2:1 ratio for one operation and a 1:4 ratio for another. The gear ratio determines the speed of rotation at the splined socket for each rotation of the outer grip 14. For example, a 2:1 gear ratio transforms two rotations of the outer grip 14 into one rotation at the splined socket 18. Thus, a 2:1 gear ratio is a slower rotation that results in more torque at the splined socket 18. A 1:4 gear ratio transforms one rotation of the outer grip 14 into four rotations at the drive member 16 and/or splined socket 18. Thus, a 1:4 gear ratio speeds up the rotation at the splined socket 18. In some embodiments, the user can select the gear ratio desired for a particular application.

In operation, a user positions a nut 42 in the splined socket 18, aligns the nut 42 with a length of threaded shaft 40 and rotates the actuator 50 (FIG. 3). Rotating the actuator 50 causes the drive member 16 to rotate at a speed determined by the gear ratio of the actuator 50 (e.g., one-half, two times, or three times the speed of the rotated actuator), thereby quickly advancing the nut 42 along the threaded shaft 40. Flywheel 52 increases the rotational inertia of drive member 16 so that drive member 16 and flywheel 52 can continue rotating without requiring continuous user input to actuator 50. In other words, the user can incrementally apply force to actuator 50 to rotate splined socket 18 and flywheel 52 continuously. The length of splined socket 18 is preferably longer than the thickness of the nut 42 such that the axial position of the nut 42 within the splined socket 18 may vary as the user advances the nut 42 along the threaded shaft 40.

As the nut 42 is advanced, threaded shaft 40 can pass through the hand tool 10 via the continuous passageway 28.

FIGS. 6 and 7 illustrate another embodiment of a hand tool 110. Hand tool 110 is illustrated in FIGS. 6 and 7 and is substantially the same as or similar to hand tool 10 illustrated in FIGS. 1-5. Except for the differences described below, hand tool 110 has all the features and capabilities of hand tool 10. In contrast to hand tool 10 described above, hand tool 110 includes a trigger actuator 150, such as a linear actuator (e.g., a trigger or lever). Even numbered features and elements of hand tool 110 correspond with similar features and elements of hand tool 10. Where similar, hand tool 10 and hand tool 110 have even numbers and hand tool 110 is assigned like reference numbers plus "100." Dissimilar elements of hand tool 110 are assigned odd numbers.

The illustrated hand tool 110 includes a housing 112, a handle or outer grip 114, a drive member 116 coupled to a splined socket 118, outer housing 114, and a drive mechanism 120 illustrated in FIG. 7, for rotating splined socket 118 relative to outer grip 114. Drive mechanism 120 includes an actuator 150, a flywheel 152 coupled to the splined socket 118, and a gear set 154 interconnecting the actuator 150 and the splined socket 118. In the illustrated embodiment, the trigger actuator 150 is a lever or trigger that is pivotally coupled to the outer housing 114. The trigger actuator 150 is pivotable in a first direction 151 (e.g., toward the outer grip 114 in the illustrated embodiment) to rotate the splined socket 118 (via the gear set 154). The actuator 150 is biased in a second direction 153, opposite the first direction 151, by a biasing member 155. The biasing member 155 may be located within the trigger actuator 105 to open the trigger actuator 150 for successive actuations. The trigger actuator 150 may be movable between an open position away from the outer grip and a closed position adjacent to the outer grip 114. The biasing member 155 biases the trigger actuator 150 to the open position away from the outer grip 114. In the illustrated embodiment, the biasing member 155 is a torsion spring; however, other biasing members (e.g., a coil spring, repelling magnets, and the like) may be used.

The gear set 154 includes a drive gear 156, an idler gear 158, and a driven gear 160 (FIG. 7). The illustrated drive gear 156 is a rack gear having a first end 157 coupled to a distal portion of the actuator 150 and a second end 159 that projects through an opening 161 in the drive housing 144 (FIG. 6), and a set of teeth 162 (FIG. 7) disposed between the first and second ends 157 and 159. The teeth 162 of the drive gear 156 mesh with a first set of gear teeth 164 on the idler gear 158 such that linear movement of the drive gear 156 in the direction of arrow 163 rotates the idler gear 158 in the direction of arrow 165. The idler gear 158 includes a second set of gear teeth 166 offset from the first set of gear teeth 164 and meshed with a driven set of gear teeth 168 on the driven gear 160. The idler gear 158 further includes a one-way ratchet 169 that couples the first set of gear teeth 164 for co-rotation with the second set of gear teeth 166 in the direction of arrow 165, and permits rotation of the second set of gear teeth 166 relative to the first set of gear teeth 164 in the direction of arrow 167.

A cam mechanism 171 may be coupled between the trigger actuator 150 and the splined socket 102. In the illustrated embodiment, cam mechanism 171 is a rack gear meshed with a circular idler gear (e.g., part of gear set 154). In other embodiments, cam mechanism 171 may include any system that transforms the linear actuator input to a rotational output. For example, a slider crank chain or another four-bar mechanism. Cam mechanism 171 can have a first inversion wherein the ground body is fixed, such as in a reciprocating engine. Cam mechanism 171 can have a second inversion wherein the crank is fixed such as in a Whitworth quick return mechanism. Cam mechanism 171 can have a third inversion wherein the connecting rod is fixed, such as in a slotted crank mechanism. Cam mechanism 171 can have a fourth inversion such that the slider is fixed such as a pendulum pump.

Cam mechanism 171 works like a transformer converting the linear movement of the trigger actuator 150 into a rotational movement at the splined socket 106. In some embodiments, cam mechanism 171 may increase or decrease the speed of rotation at the splined socket 118. For example, cam mechanism 171 may interconnect actuator 150 to gear set 154 that drives the splined socket 118. Cam mechanism 171 converts the linear movement at the trigger actuator 150 into rotational movement of the drive member 116 and splined socket 118.

Trigger actuator 150 can be a lever (e.g., as shown in FIGS. 6-7 as trigger actuator 150) pivotably coupled to the outer housing 112. Linear movement of the lever or trigger actuator 150 from a first position away from the outer grip 114 to a second position adjacent to the outer grip 114, rotates the flywheel 152 coupled to the drive member 116 of the splined socket 118. In operation, pivoting trigger actuator 150 in the first direction 151 (arrow 151) moves the drive gear 156 linearly, in the direction of arrow 163. This causes the splined socket 118 to rotate (e.g., in a clockwise direction 167), to quickly advance a nut along a threaded shaft or rod. In some embodiments, the direction the splined socket 118 rotates can be reversed. For example, a switch allows splined socket 118 to rotate in a counter-clockwise direction of arrow 165 (e.g., to remove a nut) or a clockwise direction 167 (e.g., to fasten a nut).

Flywheel 152 increases the rotational inertia of drive member 116 so that splined socket 118 can continue rotating without requiring continuous user input to actuator 150. In other words, a user can squeeze the actuator 150 one time or multiple times in succession to energize the flywheel 152, and then the flywheel 152 and splined socket 118 can continue to spin and drive the nut along the threaded shaft. When the actuator 150 is not moving or is moving in the second direction 153 (arrow 153), the ratchet 169 permits the second set of teeth 166 on the idler gear 158 to continue rotating in the direction of arrow 165.

In some embodiments, the process can be reversed to remove a nut from a threaded shaft. For example, a switch can reverse the direction of rotation for splined socket 118 when activated by the actuator 150. The user can squeeze actuator 150 one time or multiple times in succession to energize the flywheel 152 to spin the splined socket 118 to retract and remove the nut along the threaded shaft. Similarly, when the actuator 150 is not moving or is moving in the second direction 153, ratchet 169 permits the second set of teeth 166 on idler gear 158 to continue rotating in the direction of arrow 165 to remove the nut.

Figure 8:
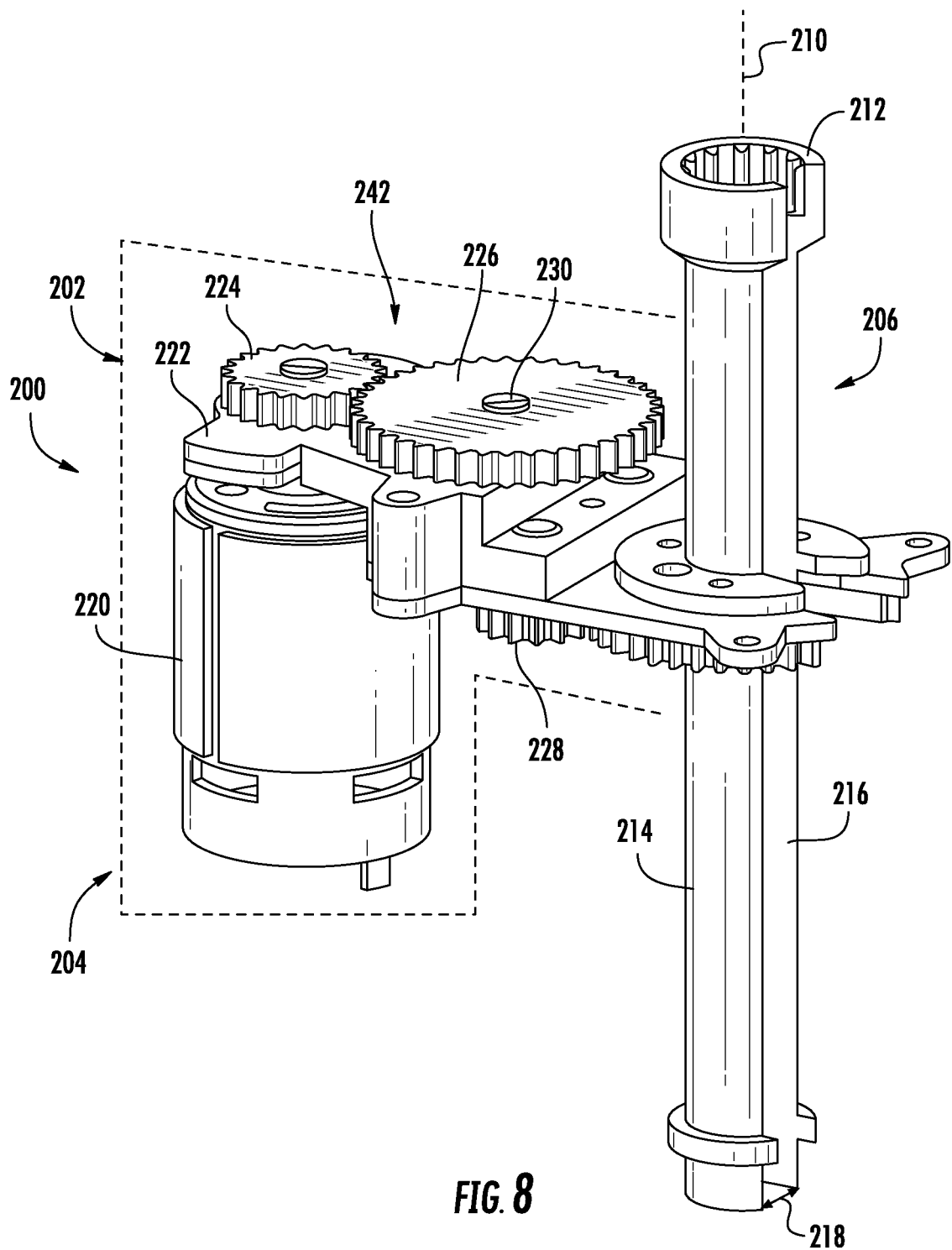
FIG. 8 is a perspective view of a powered fastener drive tool, according to an exemplary embodiment.
Figure 9:
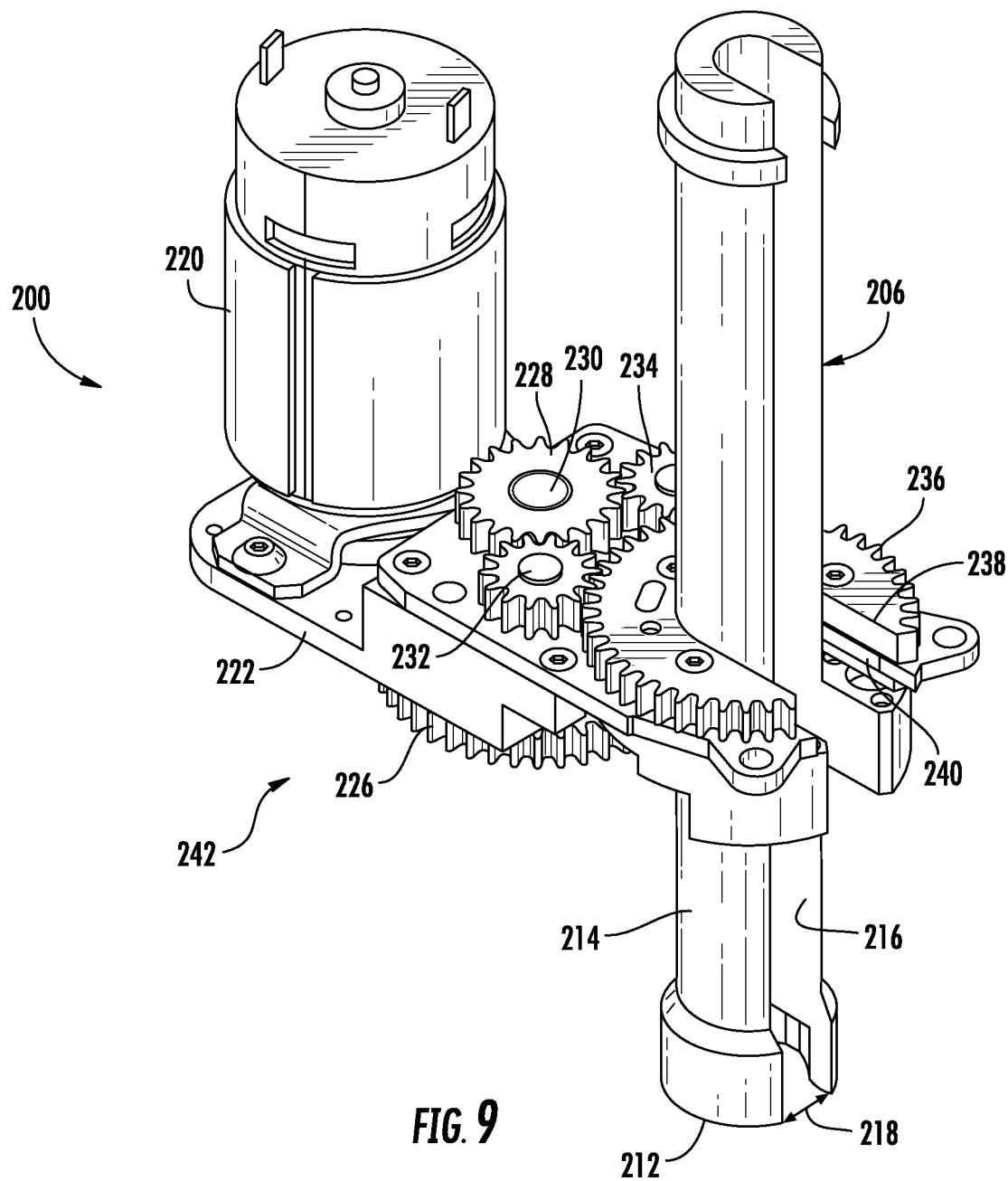
FIG. 9 is a perspective view of the powered fastener drive tool of FIG. 8, according to an exemplary embodiment.

FIGS. 8 and 9 illustrate a powered fastener drive tool or power tool 200 according to another embodiment of the invention. The illustrated power tool 200 includes a housing 202 having a handle 204, a splined socket 206 extending from the housing 202, and a drive mechanism 208 for rotating the splined socket 206 relative to the housing 202 about a longitudinal or rotational axis 210. Although illustrated schematically in FIG. 8, the housing 202 can take on a variety of shapes and configurations. In some embodiments, the handle 204 extends parallel to the rotational axis 210 which may provide the power tool 200 with a compact and ergonomic form factor.

The splined socket 206 includes a fastener engaging end 212 and an elongated hollow tube 214 extending from the fastener engaging end 212. The splined socket passes through housing 202 and defines a continuous passageway through power tool 200. Splined socket 206 includes a rotational axis 210 along the center of the splined socket 206. The splined socket may have a slot or void 216 to receive a fastener on a threaded shaft. The continuous passageway or hollow tube 214 is configured to receive a length of the threaded shaft when the power tool 200 is used to drive a fastener (e.g., a nut) along the threaded shaft. In other words, the threaded shaft can pass axially through the splined socket 206 to allow the power tool 200 to drive the fastener along any length of the threaded shaft.

The splined socket 206 also includes void 216 that extends into the hollow tube 214 along the length of splined socket 206. Void 216 has a width 218 that is at least slightly larger than a major diameter of the threaded shaft, such that the threaded shaft may be inserted into the hollow tube 214 of the splined socket 206 in a direction transverse to the rotational axis 210. Accordingly, splined socket 206 can engage a fastener at any point along a threaded shaft, without having to pass the end of the threaded shaft axially through the power tool 200.

An electric motor 220 is coupled to the splined socket 206 and configured to rotate the splined socket 206 within the housing 202. Electric motor 220 rotates the splined socket 206 at a rotational speed. Gearing 242 may increase the rotational speed of the splined socket 206 relative to the output rotational speed of the electric motor 220. Drive mechanism 208 includes the electric motor 220 (e.g., a brushed or brushless DC electric motor) mounted to a support frame 222, a pinion 224, a first idler gear 226 meshed with and driven by the pinion 224, and a second idler gear 228 coupled for co-rotation with the first idler gear 226. In some embodiments, electric motor 220 is located on a side of splined socket 206 and handle 204 is formed about electric motor 220. In some embodiments, splined socket 206 passes through electric motor 220 such that handle 204 is formed around electric motor 220. The splined socket 206 forms a passageway along hollow tube 214 about the rotational axis 210 passing through the center of the splined socket 206.

Gearing 242 interconnects the splined socket 206 to the electric motor 220. The gearing 242 may have a gear ratio that increases the rotational speed of the splined socket 206 relative to the speed of the electric motor 220. For example, pinion 224 is driven by an output of the electric motor 220 and is disposed on a first side of the support frame 222. The second idler gear 228 is disposed on an opposite side of the support frame 222 from the pinion 224 and first idler gear 226 and is coupled to the first idler gear 226 by an intermediate shaft 230 that extends through the support frame 222. The second idler gear 228 meshes with first and second spur gears 232 and 234 (FIG. 9), which are both meshed with a driven gear 236 that is coupled for co-rotation with the splined socket 206. The drive mechanism 208 may be configured to provide a speed increase from the electric motor 220 to the splined socket 206.

Referring to FIG. 9, the driven gear 236 includes a slot or void 238 that extends radially inward to the center of the driven gear 236. Void 238 in the driven gear 236 is coincident with void 216 in the splined socket 206. In other words, as driven gear 236 rotates splined socket 206, void 216, and void 238 remain aligned with respect to one another. Thus, the driven gear 236 has a gap in its external gear teeth where the void 238 is located. The support frame 222 also has a slot 240 that, in the illustrated embodiment, is the same width as the void 238 in the driven gear 236 and void 216 in the splined socket 206. The width of void 238 and slot 240 is preferably at least slightly larger than an outer diameter of the splined socket 206 hollow tube 214 so that the splined socket 206 can be removed from the power tool 200 through the void 238 in the driven gear 236 and the slot 240 in the support frame 222. The splined socket 206 can then be interchanged with other drive members of different sizes, for example. The spur gears 232 and 234 are spaced from each other by a distance that is greater than the width of the void 238 such that at least one of the spur gears 232 or 234 meshes with the driven gear 236 coupled to the splined socket 206. As the driven gear 236 rotates the respective spur gears 232 and 234 disengage from the driven gear 236 as the void 238 passes either spur gear 232 or 234.

With continued reference to FIG. 9, in operation, when slot 240 aligns with voids 216 and 238, a user can insert a length of the threaded shaft into the splined socket 206, and position the fastener engaging end 212 on a fastener. The user then energizes electric motor 220 (e.g., by pushing a button or pulling a trigger), which rotates the splined socket 206 via the drive mechanism 208 to advance the fastener along the threaded shaft. In some embodiments, the power tool 200 may include a sensor (e.g., in connection with the driven gear 236) to detect when the slot 240 in the support frame 222 aligns with the void 216 in the splined socket 206 so that when a user stops a fastener driving operation, voids 216 and 238 automatically align with slot 240 and the power tool 200 can be removed from the threaded shaft.

Figure 10:
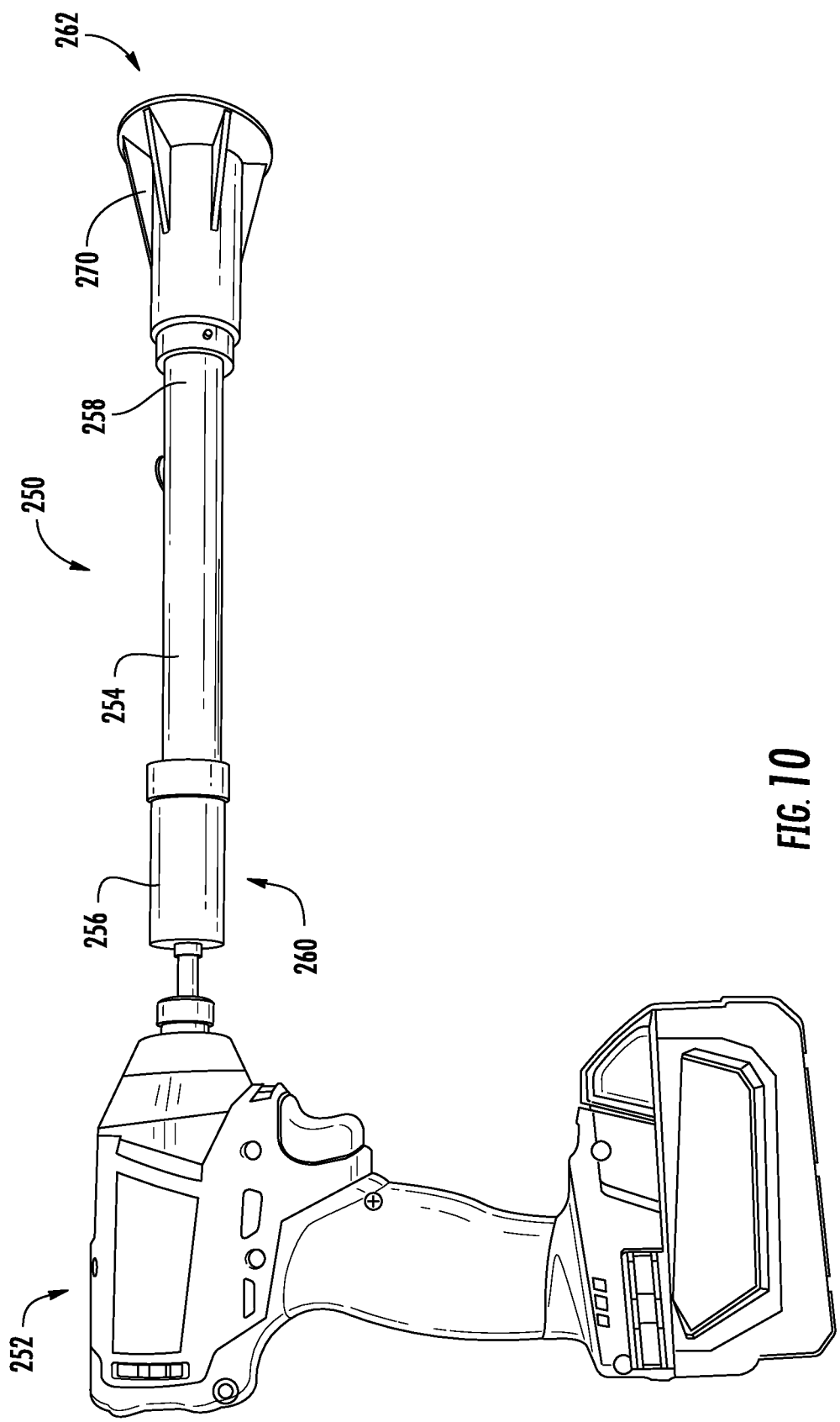
FIG. 10 is a perspective view of an extendible power tool adapter attachable to a power tool, according to an exemplary embodiment.
Figure 11:
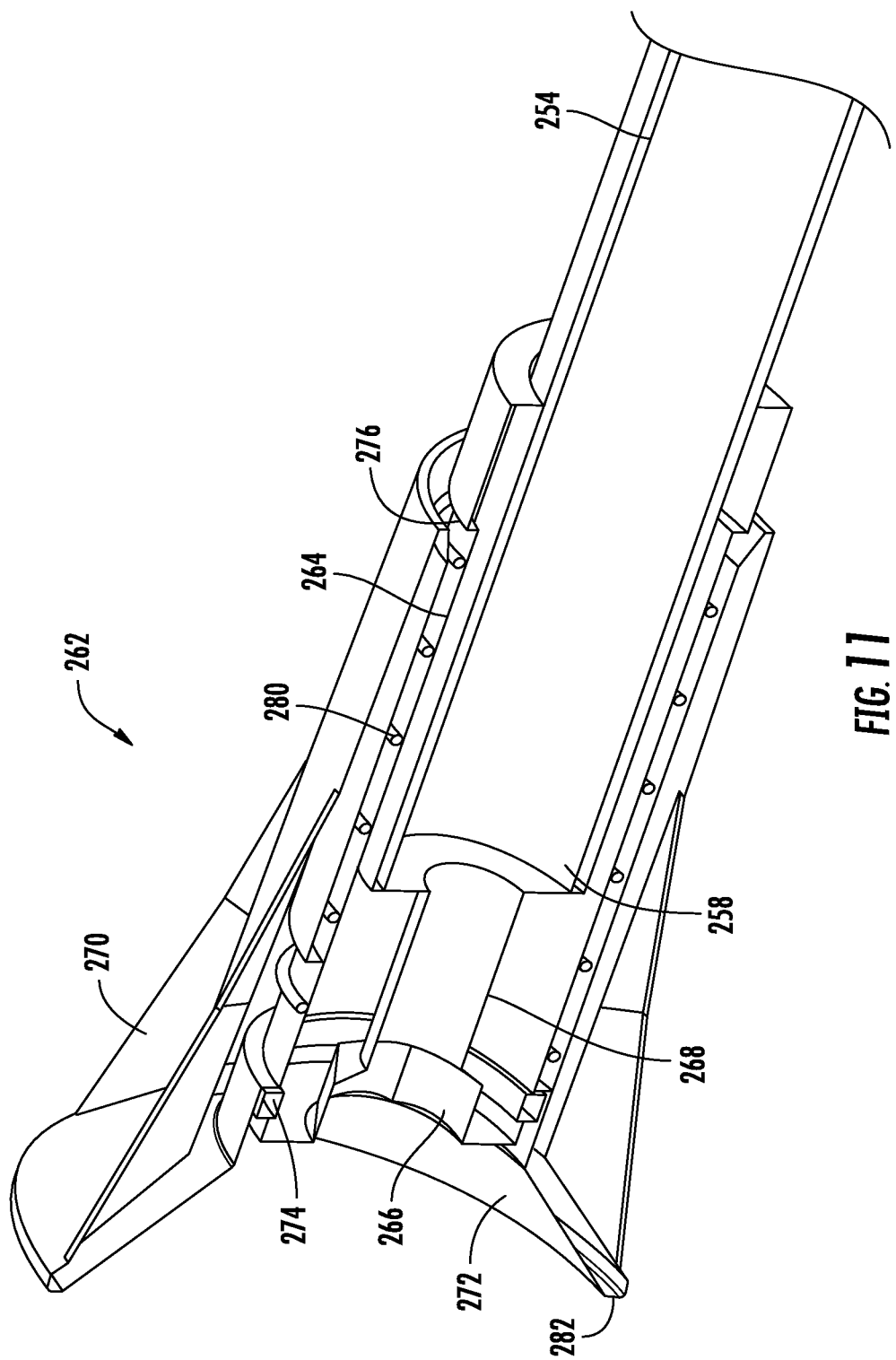
FIG. 11 is a detailed cross-sectional view of a portion of the power tool adapter of FIG. 10, including a detailed view of the frustoconical cone supporting the nut, according to an exemplary embodiment.
Figure 16:
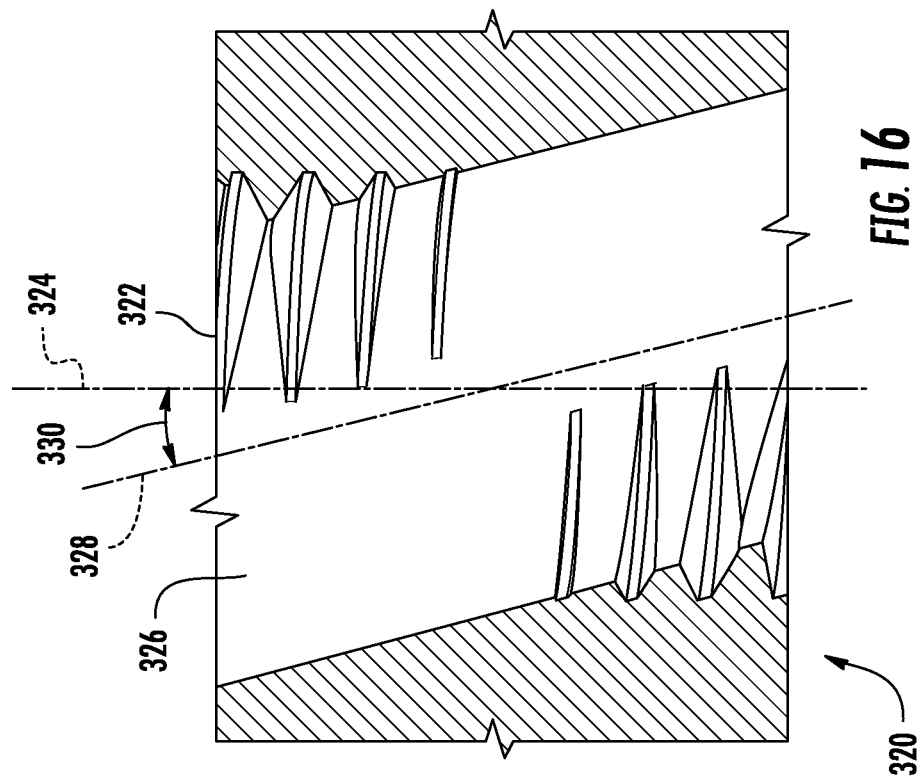
FIG. 16 is a cross-sectional view of the fastener of FIG. 15, according to an exemplary embodiment.
Figure 15:
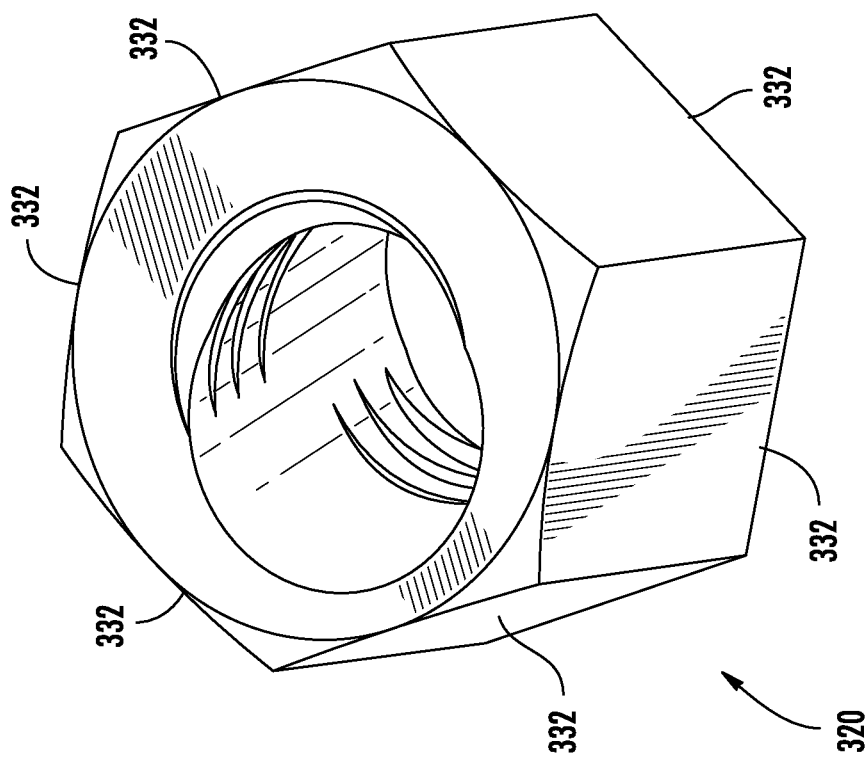
FIG. 15 illustrates another embodiment of a quick-set fastener, according to an exemplary embodiment.

The power tool 200 of FIGS. 8-9 can combine with features of the power tool receiver 250 illustrated in FIGS. 10-11. In some embodiments, the powered power tool 200 may include a frustoconical inner guide 270 coupled to the splined socket 206. The frustoconical inner guide 270 may have a larger inner diameter at a first end (e.g., outer shoulder 282) and a smaller inner diameter at a second end (e.g., at fastener-engaging feature 266). The larger diameter receives the fastener and orients the fastener through the frustoconical inner guide surface 272 to the smaller diameter. In the fastener engaging feature, the fastener is oriented within the frustoconical inner guide 270. This frustoconical inner guide 270 structure may help orient the fastener when it first engages a threaded shaft. In some embodiments, the powered power tool 200 may include an elongated member 254 that is rigidly coupled to the splined socket 206 to extend the reach of the splined socket 206. For example, the elongated member 254 may have a second splined socket 206 at a fastener-engaging feature 266 having an outer end spaced a distance from an outer end of the splined socket 206. The extended splined socket 206 at the fastener-engaging feature 266 is rotated as the splined socket 206 of the power tool 200 is rotated.

FIGS. 10 and 11 illustrate a power tool receiver 250 according to another embodiment. Power tool receiver 250 is configured to couple with a power tool 252 such as a drill and includes a hollow elongated member 254 having a first end 256 and a second end 258 opposite the first end 256. In some embodiments, power tool receiver 250 may couple to a fastener drive hand tool such as hand tool 10 or hand tool 110. In the illustrated embodiment, an attachment structure 260 (e.g., a hexagonal shaft, a cylindrical shaft, a square shaft, etc.) is provided at the first end 256, allowing power tool receiver 250 to be attached to an output of a rotary power tool 252 or rotary hand tool 10 or 110.

With reference to FIG. 11, a fastener positioning assembly 262 is coupled to the elongated member 254 at the second end 258. The fastener positioning assembly 262 includes a collar 264 that surrounds the second end 258 of the elongated member 254. The collar 264 may be secured to the elongated member 254 by a set screw, or by other methods, such as a cam-lock or other quick-connect fitting. Alternatively, the collar 264 may be press fit on the elongated member 254. The collar 264 includes a fastener-engaging feature 266 (e.g., a hexagonal recess) at a distal end of the collar 264, and a bore 268 that extends through the collar 264 and communicates with the interior of the hollow elongated member 254.

The fastener positioning assembly 262 also includes a frustoconical inner guide 270 coupled to and at least partially surrounding the collar 264. The frustoconical inner guide 270 includes a generally frustoconical inner guide surface 272 that extends outward from the fastener-engaging feature 266. The illustrated frustoconical inner guide 270 is coupled for generally linear movement along the collar 264, to an extent limited in the forward direction by a retaining ring 274 and in the rearward direction by a shoulder 276 on the collar 264. The collar 264 is biased forward by a spring 280. In operation, the frustoconical inner guide surface 272 of the frustoconical inner guide 270 assists a user in guiding a fastener held in the fastener-engaging feature 266 on a threaded shaft.

Alternatively, the frustoconical inner guide surface 272 assists the user in guiding the fastener-engaging feature 266 onto a threaded shaft for engagement with a fastener already positioned on the threaded shaft. The frustoconical inner guide 270 is movable rearward against the force of the spring 280, allowing the fastener-engaging feature 266 to move into a position flush with or, in some embodiments, extending beyond an outer shoulder 282 of the frustoconical inner guide 270. Power tool receiver 250 can then be rotated (e.g., by operating the power tool 252 or manually rotating power tool receiver 250) to drive the fastener along the threaded shaft. Power tool receiver 250 may be particularly advantageous when advancing fasteners in an overhead orientation. In some embodiments, the elongated member 254 may be a piece of standard sized conduit, such as electrical conduit, or standard sized pipe. In some embodiments, the elongated member 254 may be interchanged with other elongated members of different lengths.

FIGS. 12-14 illustrate a quick-set fastener or nut 300 according to an embodiment of the invention. The nut 300 includes a threaded bore 302 extending through the nut 300 and defining a rotational axis 304 of the nut 300. An angled cut-away portion or opening 306 intersects the bore 302. The cut-away opening 306 defines a width 308 that is slightly greater than the diameter of a threaded shaft 310. Thus, the nut 300 can be rotated to an angled position (see, e.g., FIG. 13) to align the cut-away opening 306 with the length of the threaded shaft 310; then the threaded shaft 310 can be inserted into the nut 300 through the cut-away opening 306. Next, the nut 300 is rotated to align the rotational axis 304 of the nut 300 with the threaded shaft 310 (see, e.g., FIG. 14).

Once aligned, the threads in the nut 300 engage the threads of the threaded shaft 310, and the nut 300 can be rotated to advance the nut 300 along the threaded shaft 310, similar to a conventional nut threadedly engaged on a threaded shaft 310. Thus, the quick-set nut 300 can be used in place of a traditional nut and can be installed without having to run the nut 300 along the threads of threaded shaft 310. Instead, the quick-set nut 300 can be positioned at a desired location along the threaded shaft 310, and then optionally rotated to threadedly engage the shaft and further advance the nut along the threaded shaft 310.

FIGS. 15-18 illustrate a quick-set fastener or nut 320 according to another embodiment of the invention. The nut 320 includes a threaded bore 322 extending through the nut 320 along a first axis 324, and a non-threaded or smooth bore 326 extending through the nut 320 along a second axis 328 that intersects the first axis 324 at an angle 330. In the illustrated embodiment, the angle 330 is between about 5 degrees and about 30 degrees. For example, the angle 330 may be 5°, 10°, 15°, 20°, 25°, 30°, 35°, 40°, or 45°. The nut 320 also includes an outer periphery formed with a plurality of drive surfaces 332. In the illustrated embodiment, the nut 320 includes six drive surfaces 332 such that the nut 320 has a hexagonal shape. In other embodiments, the nut 320 may have other shapes.

Figure 17:
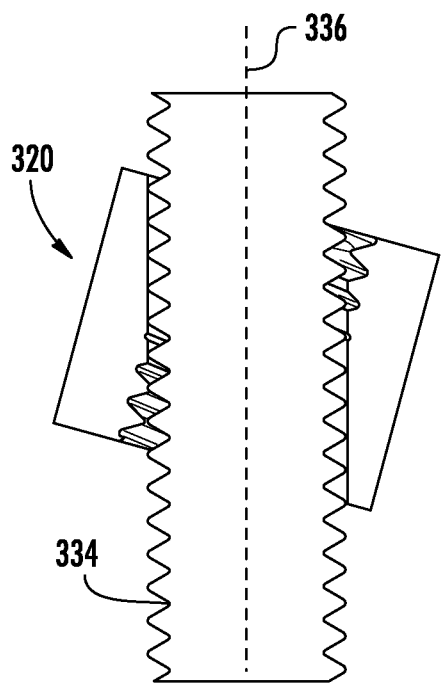
FIG. 17 illustrates the fastener of FIG. 15 in a sliding adjustment position or angled position, according to an exemplary embodiment.
Figure 18:
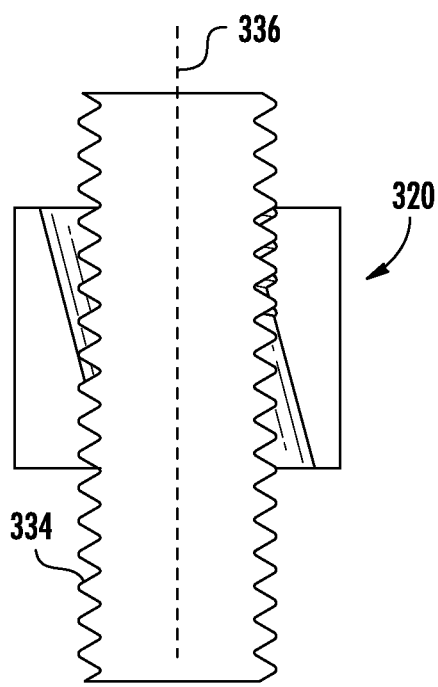
FIG. 18 illustrates the fastener of FIG. 15 in a threaded adjustment position or aligned position in threaded engagement with the threaded shaft, according to an exemplary embodiment.

FIG. 17 illustrates the nut 320 in a sliding adjustment position on a threaded shaft 334. In the sliding adjustment position, the second axis 328 of the non-threaded or smooth bore 326 is aligned with a longitudinal axis 336 of the threaded shaft 334. The diameter of the smooth bore 326 is at least slightly larger than the major diameter of the threaded shaft 334 such that the nut 320 can be slid along the length of the threaded shaft 334 without rotating the nut 320. The nut 320 can then be rotated to a threaded adjustment position illustrated in FIG. 18. In the threaded adjustment position, the first axis 324 of the threaded bore 322 is aligned with the longitudinal axis 336 of the threaded shaft 334, and the threads of the bore 322 are sized to threadedly engage with the threaded shaft 334. Thus, the nut can advance along the threaded shaft 334 by rotating the nut 320 about the first axis 324.

With reference to FIGS. 12-18, two embodiments of a nut 300, 320 are shown. In operation, a nut 300 or nut 320 may include drive surfaces 332 along a periphery of the nut 300 or 320. The drive surfaces 332 are configured to receive a tool to rotate the nut 300 or 320 about a threaded shaft 310 or 334 along a first axis of the nut 300 or 320. The nut 300 or 320 includes a threaded bore 322 that extends through the nut 300 or 320 along the first axis 324 of the nut 300 or 320. The threaded bore 322 is configured to couple to a threaded shaft passing through the threaded bore 322 along the first axis 324 of the nut 300 or 320. A smooth bore 326 extends through the nut 300 or 320 along a second axis 328 of the nut 300 or 320 that intersects the first axis 324 of the nut 300 or 320 at an acute angle. The smooth bore 326 has a diameter configured to receive an outer diameter of the threaded shaft and enable the threaded shaft to slide freely through the smooth bore 326.

In some embodiments, nut 300 or 320 includes an opening 306 along the periphery and through one or more drive surfaces 332 in the direction of the second axis 328. The opening 306 is configured to receive the threaded shaft inserted laterally into the nut 300 or 320 through the opening 306. The threaded shaft can then slide along the second axis 328 of the nut 300 or 320. When the nut 300 or 320 is positioned, the nut 300 or 320 rotates to the first axis 324 to threadedly engage the threaded shaft along the threaded bore 302 or 322. The opening 306 can extend at an angle from the threaded bore 302 or 322 and parallel to the angle 330 of the smooth bore 326. The opening 306 can extend across two or more adjacent drive surfaces 332 of the nut 300 or 320.

Nut 300 or 320 and threaded bore 302 or 322 may have an American National Standard Institute (ANSI) dimension for the nominal diameter and thread pitch fastener size. For example a ¼"×20 UNC with 20 threads per inch. The nut 300 or 320 and threaded bore 302 or 322 may have a metric nominal diameter and thread pitch fastener size. For example, an M8-1.0×20, where M indicates a metric size, 8 equals the nominal diameter in mm, 1.0 equals the pitch in mm, and 20 indicates the length in mm. Nut 300 or 320 may have a protective coating, for example, zinc/aluminum, fluoropolymers, molybdenum disulfide, thermally cured epoxy, inorganic zinc, phenol, phosphates, and/or other protective coatings.

Figure 19:
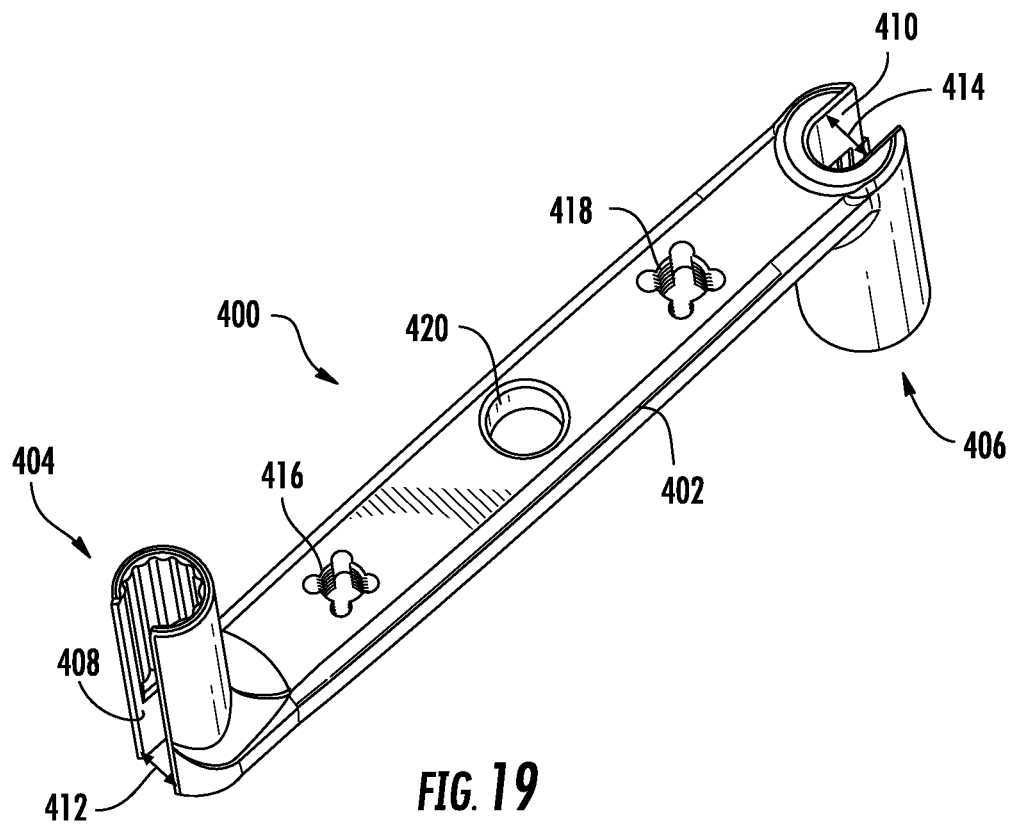
FIG. 19 is a perspective view of a fastener drive tool according to an exemplary embodiment.

FIG. 19 illustrates a fastener drive tool 400 according to another embodiment of the invention. The fastener drive tool 400 includes a handle 402, a first drive member 404 disposed at a first end of the handle 402, and a second drive member 406 disposed at a second end of the handle 402 opposite the first end. In the illustrated embodiment, each of the drive members 404, 406 is a socket and may be configured to receive fasteners of the same or different nominal sizes. Each of the drive members 404 and 406 includes a respective slot 408 and 410 that extends into the interior of the drive member 404 and 406. The first slot 408 defines a first width 412 that is at least slightly greater than a major diameter of a threaded shaft but smaller than a major diameter of a fastener that can be driven along the threaded shaft by the drive member 404. Likewise, the second slot 410 defines a second width 414 that is at least slightly greater than a major diameter of a threaded shaft but smaller than a major diameter of a fastener that can be driven along the threaded shaft by the drive member 406. Thus, the slots 408 and 410 allow the drive members 404 and 406 to be slid onto a threaded shaft without having to pass the fastener drive tool 400 over the end of the threaded shaft.

The illustrated fastener drive tool 400 further includes two dies 416 and 418 that can be used to clean up damaged threads on a shaft or to cut threads into an unthreaded shaft. The two dies are sized for the threads on the rods corresponding to the sizes of the drive members. For example, the first die 416 is sized to cut threads that can mate with threads of a fastener that can be driven by the first drive member 404, and the second die 418 is sized to cut threads that can mate with a thread of a fastener that can be driven by the second drive member 406. In the illustrated embodiment, the fastener drive tool 400 further includes an aperture 420 in the center of the handle 402, between the drive members 404, 406, that may be particularly suited for attachment to a lanyard.

Figure 20:
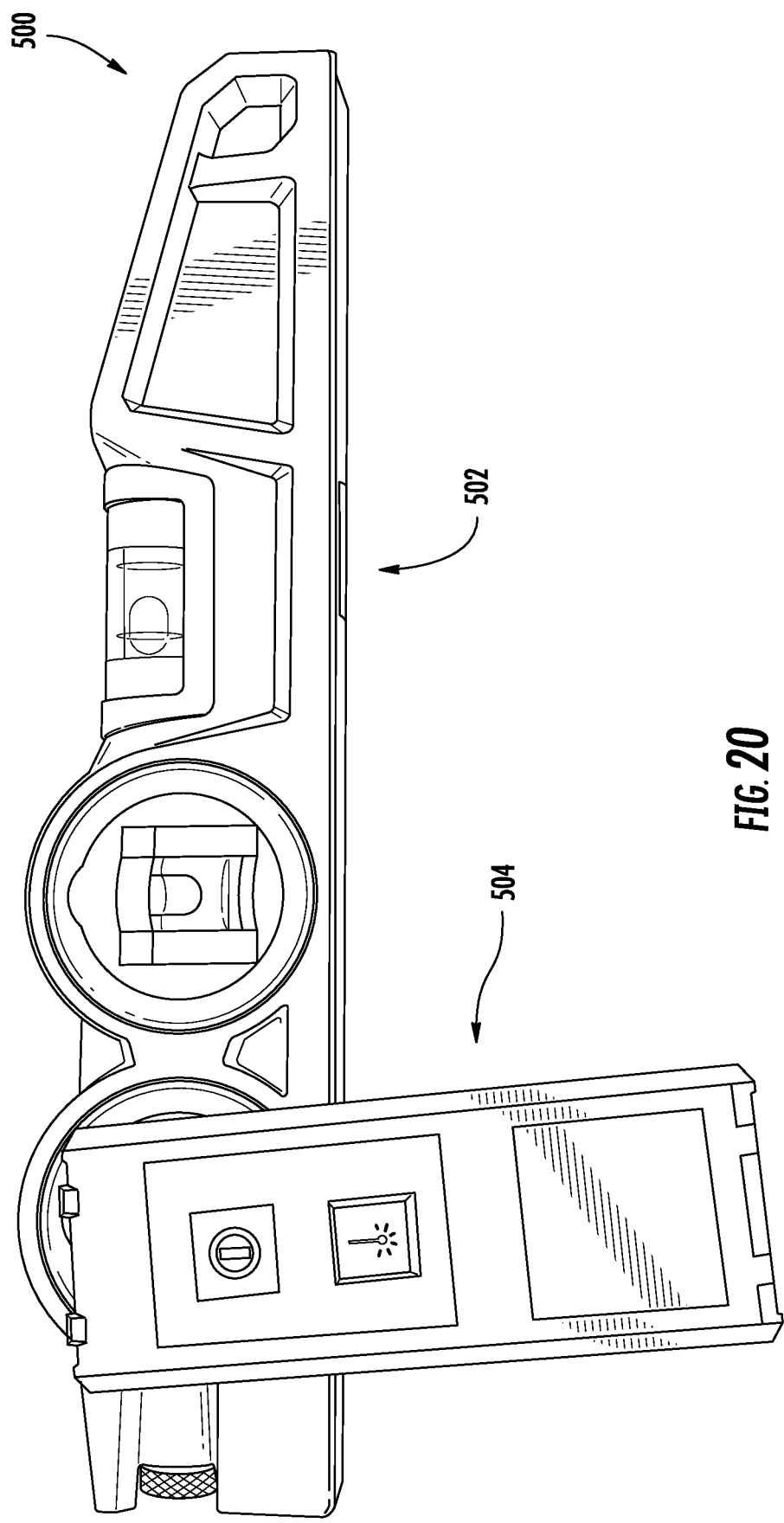
FIG. 20 is a side view of a measuring tool, according to an exemplary embodiment.
Figure 21:
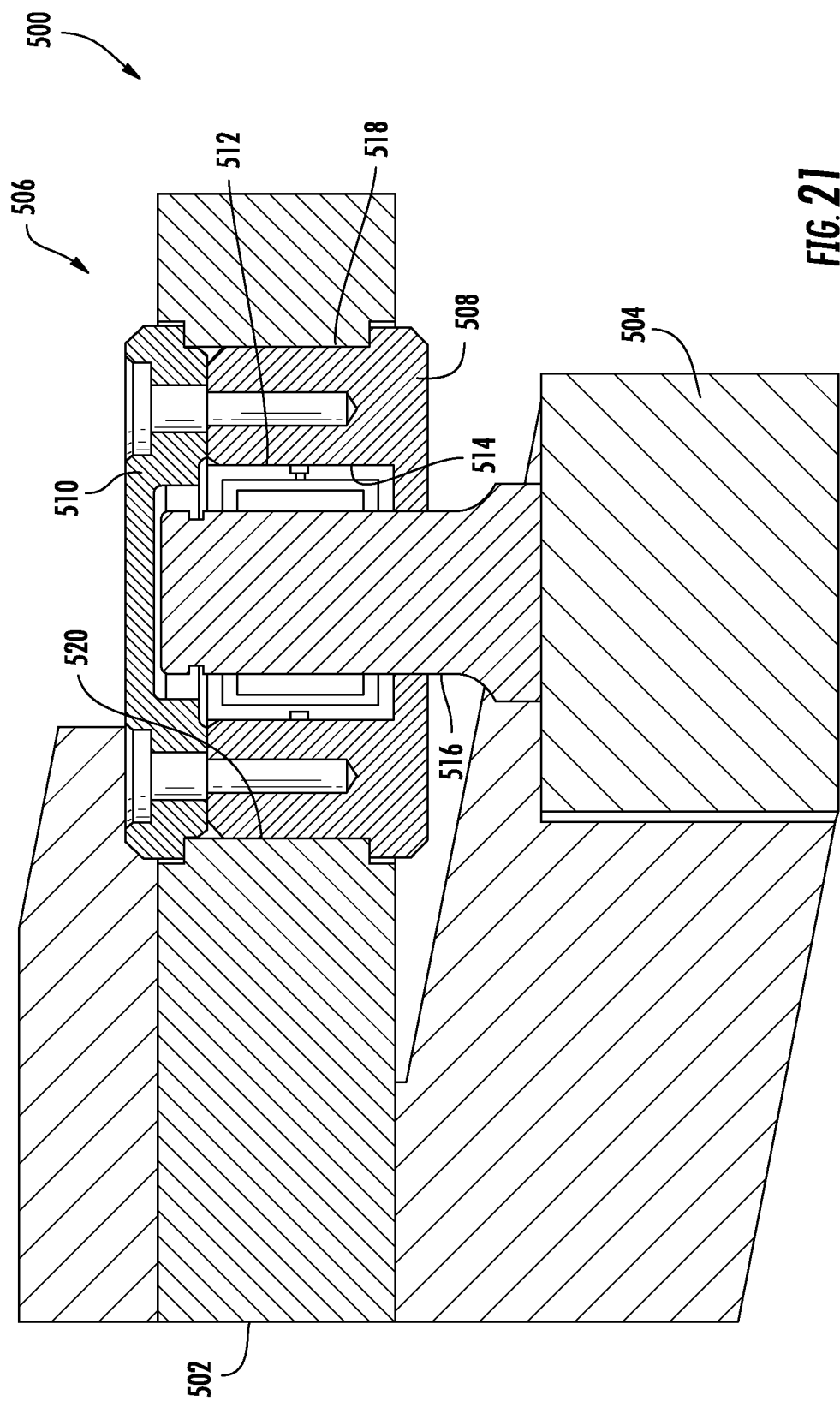
FIG. 21 is a cross-sectional view of a portion of the measuring tool of FIG. 20.

FIGS. 20-21 illustrate a measuring and alignment tool 500 according to another embodiment of the invention. The tool 500 includes a level 502 (e.g., a torpedo style level) and a laser distance measuring unit 504 coupled to the level 502.

With reference to FIG. 21, in the illustrated embodiment the measuring unit 504 is pivotally coupled to the level 502 via a swivel assembly 506. The swivel assembly 506 includes a first clamp member 508, a second clamp member 510, and a bearing 512 secured within a recess 514 in the first clamp member 508. The measuring unit 504 includes a pivot shaft 516 that is supported by the bearing 512. The swivel assembly 506 extends through a bore 518 in the level 502, and the clamp members 508, 510 secure the swivel assembly 506 in the bore 518 by clamping an inner annular wall 520 of the level 502.

In operation, the tool 500 can be used as a typical level to ensure that items (e.g., threaded shafts, Unistrut framing, wire racks, etc.) are level or otherwise correctly oriented. The tool 500 can simultaneously measure the distance from the ground to the level 502 (calibrated, for example, to a base surface of the level), and the angle of an object to be measured relative to the ground. Because the measuring unit 504 is pivotally coupled to the level 502 via the swivel assembly 506, the measuring unit 504 points directly down under the influence of gravity. The bearing 512 advantageously allows relatively friction-free rotation of the measuring unit 504 relative to the level 502.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

What is claimed is:

1. A hand tool, comprising:
   a housing forming an outer grip, the housing having a front end and a back end opposite of the front end;
   a splined socket passing through the housing and defining a passageway that extends from the front end of the housing to the back end of the housing;
   a rotatable actuator that rotates the splined socket within the housing as a rotational force is applied to the outer grip;
   gearing interconnecting the rotatable actuator to the splined socket, wherein the gearing increases a rotational speed of the splined socket relative to a rotational speed of the outer grip as the housing is rotated; and
   wherein the rotational speed of the splined socket relative to the outer grip is increased as the outer grip is rotated.

2. The hand tool of claim 1, further comprising a flywheel coupled to the splined socket that adds circumferential mass to the splined socket to conserve rotational inertia of the splined socket as the rotational force is applied to the outer grip.

3. The hand tool of claim 1, further comprising a power tool receiver wherein a power tool attaches to the power tool receiver to rotate the rotatable actuator and the splined socket.

4. The hand tool of claim 1, wherein the passageway extends through the housing and the splined socket is hexagonal shaped and configured to receive a hexagonal nut.

5. The hand tool of claim 1, wherein the passageway and the splined socket extend through the housing and the splined socket extends along a central longitudinal axis of the housing, the splined socket passing through a center of the housing.

6. The hand tool of claim 1, wherein the splined socket includes a smaller diameter through a part of the splined socket defining a shoulder, wherein the shoulder is shaped to consistently position a nut concentrically within the passageway of the splined socket, and wherein the outer grip is a circular cross-sectional shape.

7. The hand tool of claim 1, further comprising a brushless direct current (DC) electric motor coupled to the rotatable actuator and to the gearing to rotate the splined socket, and wherein a gear ratio between the rotational actuator and the splined socket is 1:2.

8. The hand tool of claim 1, wherein the gearing is adjustable to provide different gear ratios, the gearing providing a first gear ratio that rotates the splined socket a first speed relative to rotation at the outer grip, and a second gear ratio that rotates the splined socket a second speed relative to rotation at the outer grip, wherein the first speed is less than the second speed.

9. A hand tool, comprising:
   an outer housing forming an outer grip, the outer housing having a front end and a back end opposite of the front end;
   a splined socket coupled to the outer housing, the splined socket passing through the outer housing and defining a passageway through the outer housing from the front end of the outer housing to the back end of the outer housing;
   a trigger actuator coupled to the splined socket; and
   gearing interconnecting the trigger actuator to the splined socket, wherein the gearing increases a rotational speed of the splined socket relative to the rotational speed generated by the trigger actuator;
   wherein movement of the trigger actuator generates rotation of the splined socket, and the gearing interconnecting the trigger actuator to the splined socket increases the rotational speed of the splined socket relative to the movement of the trigger actuator.

10. The hand tool of claim 9, further comprising a cam mechanism coupled between the trigger actuator and the splined socket, the cam mechanism converting movement of the trigger actuator into a rotational movement of the splined socket.

11. The hand tool of claim 9, further comprising a flywheel coupled to the splined socket, wherein a mass of the flywheel generates a rotatable circumferential mass of the splined socket and conserves rotational inertia of the splined socket.

12. The hand tool of claim 9, further comprising a biasing member within the trigger actuator, the trigger actuator being movable between an open position away from the outer grip and a closed position adjacent to the outer grip, wherein the biasing member biases the trigger actuator to the open position away from the outer grip.

13. The hand tool of claim 9, further comprising a flywheel, wherein the trigger actuator is a lever pivotably coupled to the outer housing, wherein linear movement of the lever from a first position away from the outer grip to a second position adjacent to the outer grip, rotates the flywheel of the splined socket.

14. The hand tool of claim 9, further comprising a power tool receiver coupled to the gearing, wherein a power tool is coupled to the power tool receiver to drive rotation of the splined socket.

15. The hand tool of claim 9, wherein the splined socket includes a hexagonally shaped passageway to fit a hexagonal nut and the splined socket has a shoulder extending inward from a surface defining the passageway, wherein a width of the passageway at the shoulder is less than a width at an open end of the passageway, the shoulder orients the hexagonal nut within the splined socket and prevents the hexagonal nut from passing through the splined socket.

16. The hand tool of claim 9, wherein an outer diameter of the splined socket increases or decreases when the splined socket is restrained against applied rotation of the outer grip, wherein the outer diameter is reduced to clamp a bit within the splined socket when the splined socket is restrained, and the outer grip is rotated in a first direction, the outer diameter is expanded to remove a clamped bit within the splined socket when the splined socket is restrained, and the outer grip is rotated in a second direction.

17. A power tool, comprising:
a housing defining a handle;
a splined socket coupled to the housing, the splined socket passing through the housing and defining a passageway through the housing, the splined socket forming the passageway along a longitudinal axis passing through a center of the splined socket, the splined socket having a void that receives a fastener on a threaded shaft;
a motor coupled to the splined socket and configured to rotate the splined socket within the housing, the motor providing a speed of rotation;
gearing interconnecting the splined socket to the motor, wherein the gearing has a gear ratio that increases a rotational speed of the splined socket relative to the rotational speed of the motor, the gearing including a driven gear coupled to the splined socket;
a first slot through the driven gear; and
a second slot through the housing;
wherein the first slot and second slot each have a width greater than a diameter of the splined socket and configured to facilitate interchanging the splined socket, wherein the first slot, second slot, and the void in the splined socket align to receive the fastener on the threaded shaft within the splined socket;
wherein the handle extends parallel to the longitudinal axis.

18. The power tool of claim 17, further comprising a frustoconical inner guide coupled to the splined socket, the frustoconical inner guide having a larger inner diameter at a first end and a smaller inner diameter at a second end to orient the fastener within the frustoconical inner guide, wherein the fastener is oriented when first engaging the threaded shaft.

19. The power tool of claim 17, further comprising an elongated member rigidly coupled to the splined socket, the elongated member further including a second splined socket having a second outer end spaced at a distance from an outer end of the splined socket, wherein rotation of the splined socket rotates the second outer end of the second splined socket.

20. The power tool of claim 17, wherein the splined socket passes through the motor, and the handle is formed around the motor.

* * * * *